United States Patent [19]

Bickel

[11] Patent Number: 4,609,228
[45] Date of Patent: Sep. 2, 1986

[54] METHOD AND MACHINE FOR MANUFACTURING BRUSHES

[75] Inventor: Wolfgang Bickel, Rimbach, Fed. Rep. of Germany

[73] Assignee: Schlesinger GmbH & Co. Maschinenbau KG, Burgwald, Fed. Rep. of Germany

[21] Appl. No.: 690,007

[22] Filed: Jan. 9, 1985

[30] Foreign Application Priority Data

Jan. 10, 1984 [DE] Fed. Rep. of Germany ....... 3400510
Feb. 13, 1984 [DE] Fed. Rep. of Germany ....... 3405001

[51] Int. Cl.⁴ .............................................. A46D 3/04
[52] U.S. Cl. ......................................... 300/4; 264/243; 300/5; 300/7; 300/8; 300/21; 425/805
[58] Field of Search ....................... 264/243; 300/2–11, 300/21; 425/805

[56] References Cited

U.S. PATENT DOCUMENTS 3,408,112 10/1968 Piotrowski ............................ 300/21
3,604,043 9/1971 Lewis .
4,255,224 3/1981 Lorenz ............................... 300/10 X

FOREIGN PATENT DOCUMENTS 1114463 10/1964 Fed. Rep. of Germany .
2849510 6/1980 Fed. Rep. of Germany .
2922877 12/1980 Fed. Rep. of Germany .

Primary Examiner—Mark Rosenbaum
Attorney, Agent, or Firm—Flynn, Thiel, Boutell & Tanis

[57] ABSTRACT

A method and machine for manufacturing brushes, in which bristle bunches are manufactured before being transported to a brush member, the individual bristles being connected to one another. Bristle bunches which are prepared in this manner are distributed by a distributor block to plural tubular conduits leading to a bristle bunch holder which holds the bristle bunches in a desired orientation relative to the brush member. The bristle bunches and the brush member are welded together by pressing them against one another, both the bristle bunches and the brush member having previously been softened at the welding regions. The tubular conduits can be of any desired length and can be routed in any desired direction to the brush member, which permits the manufacture of all brush shapes.

57 Claims, 40 Drawing Figures

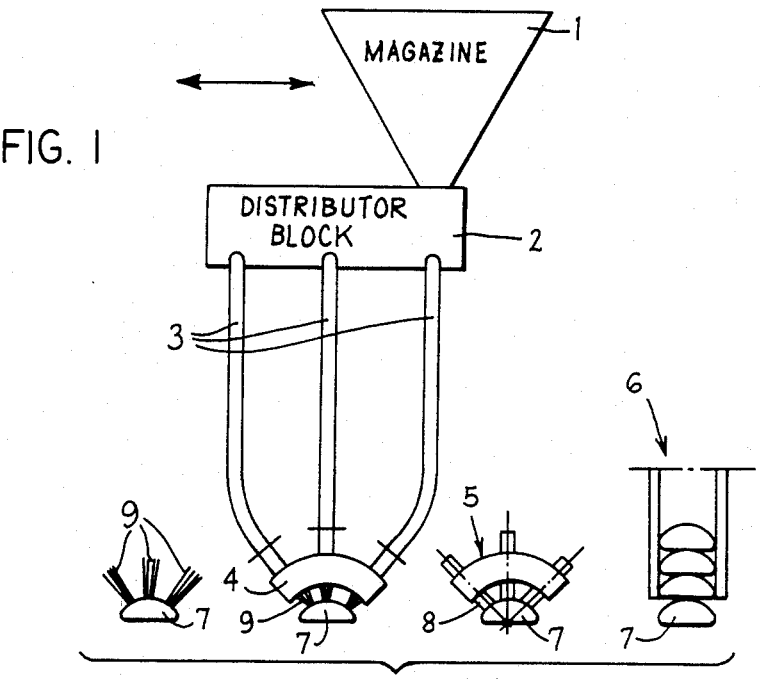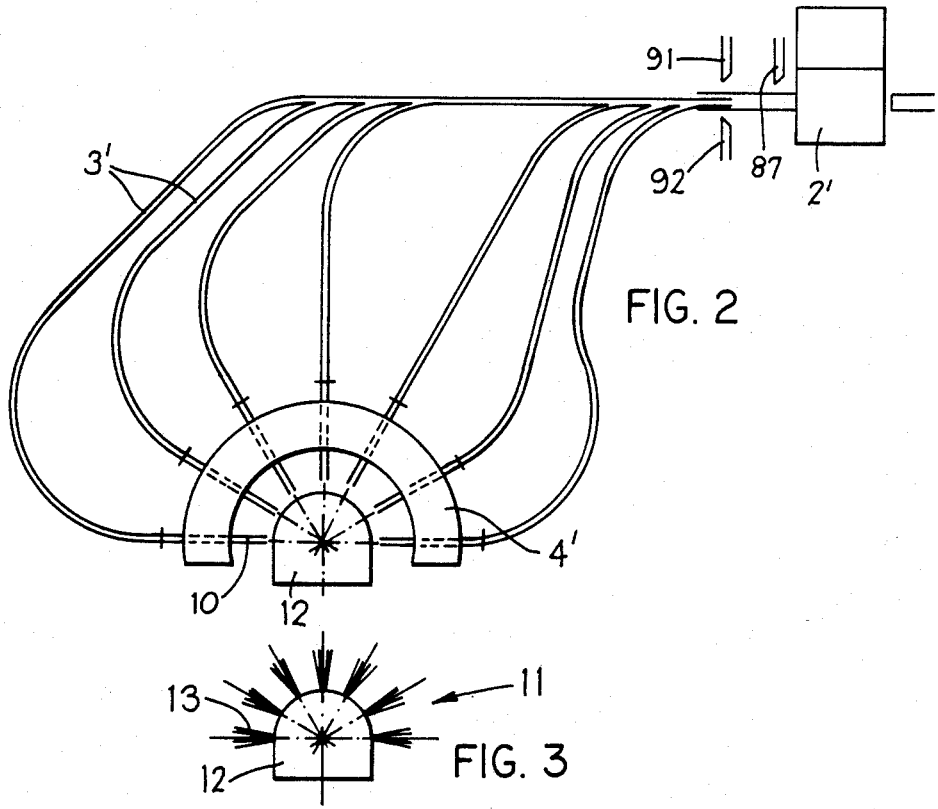

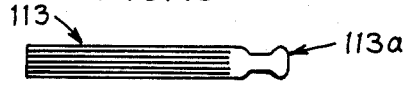
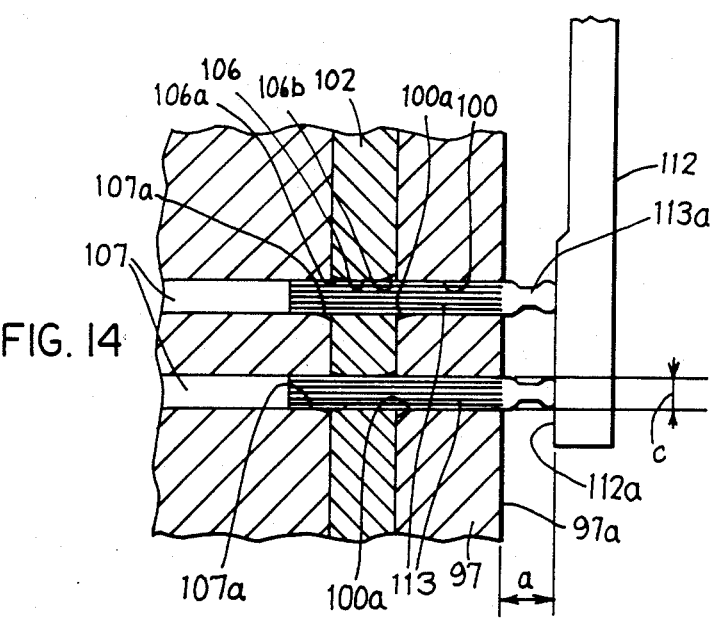
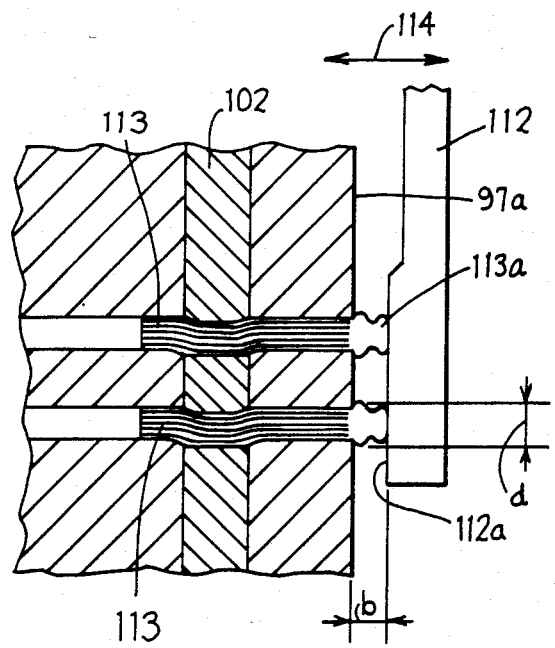

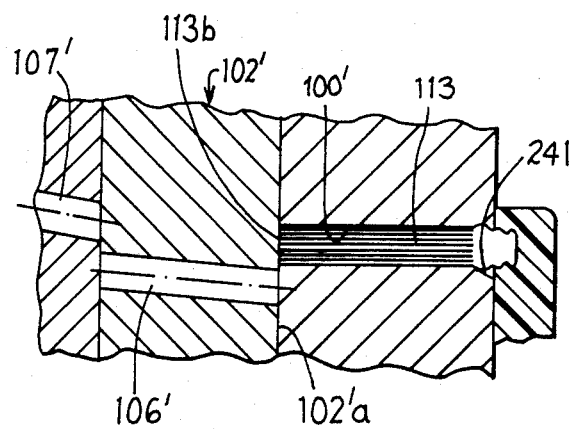

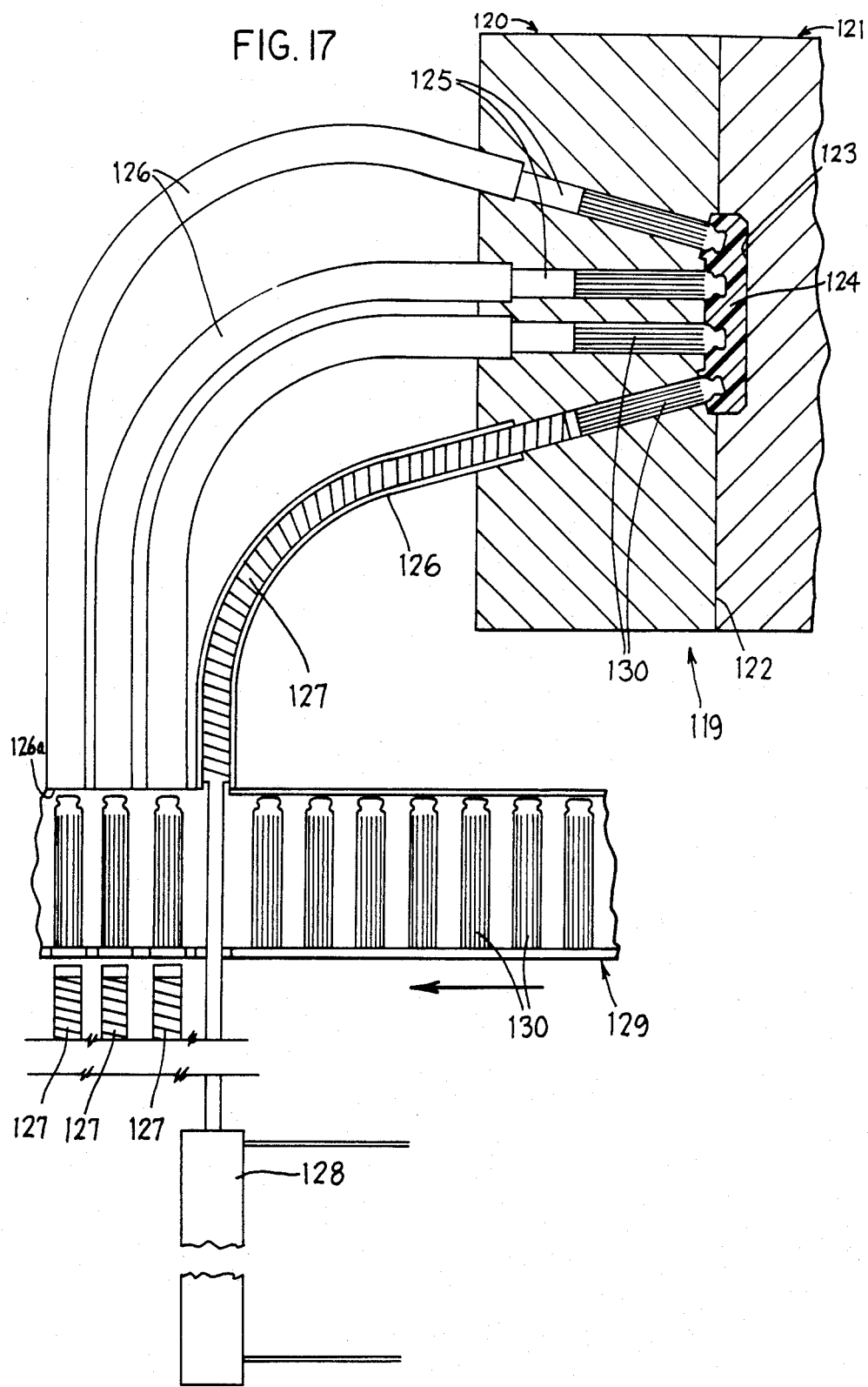

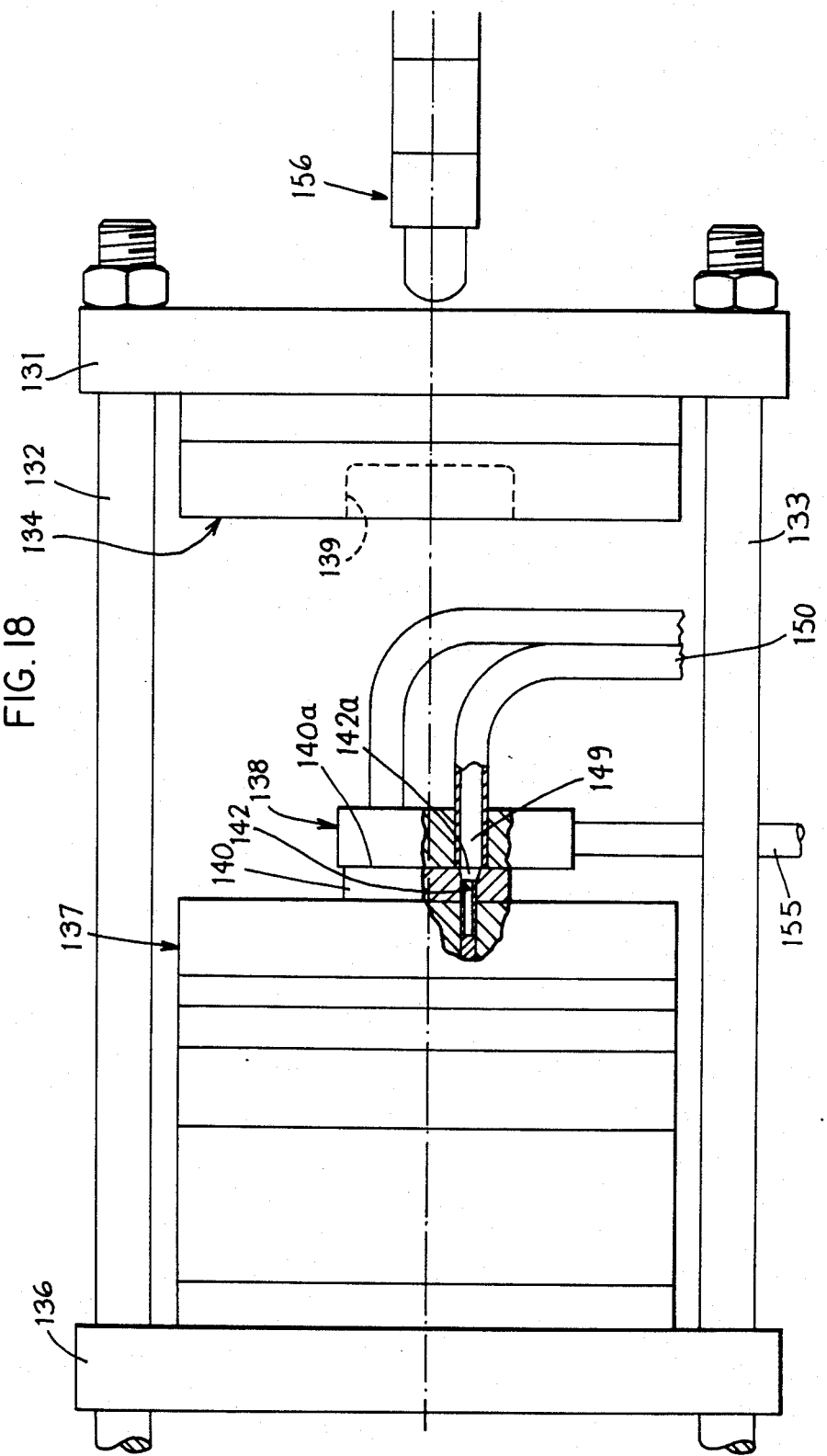

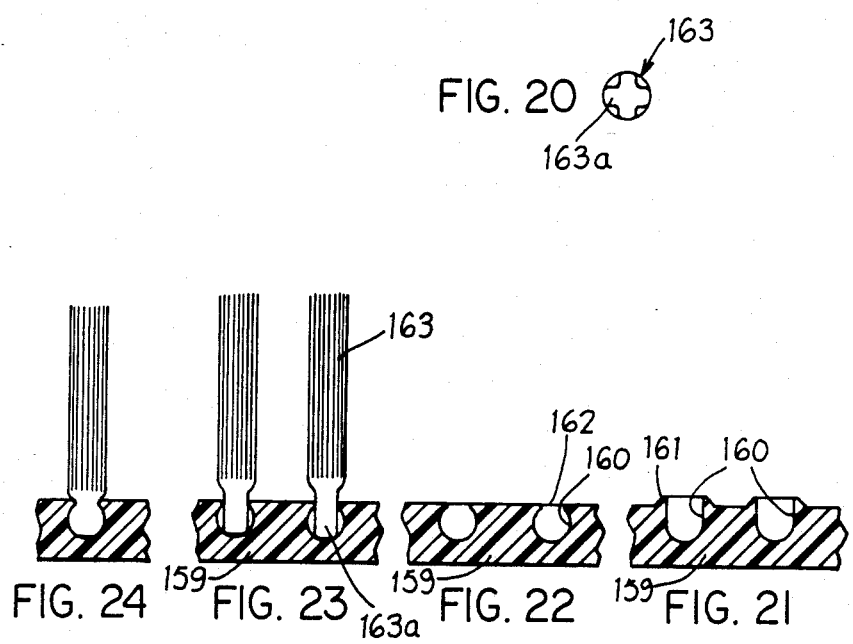

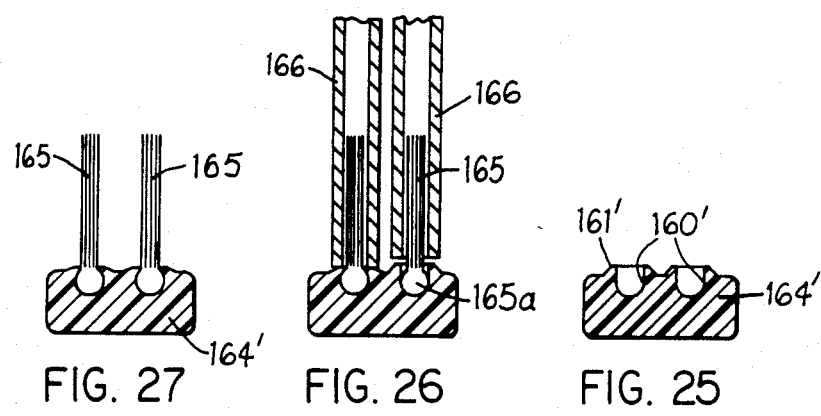

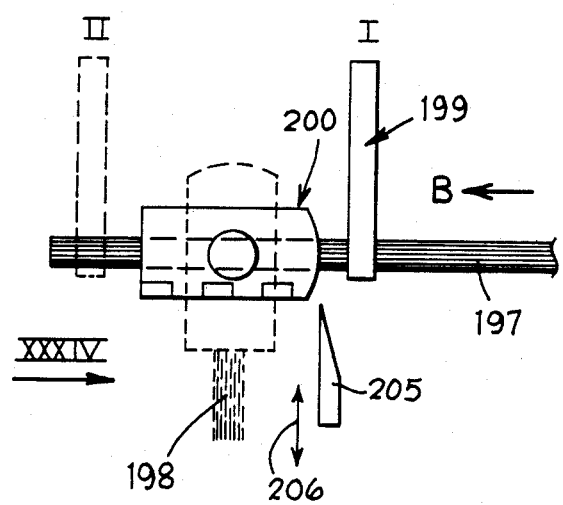
FIG. 33
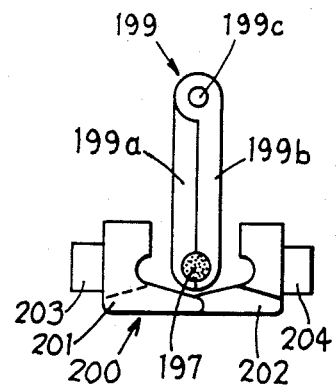
FIG. 34
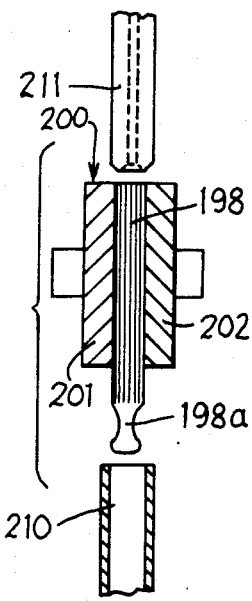
FIG. 37
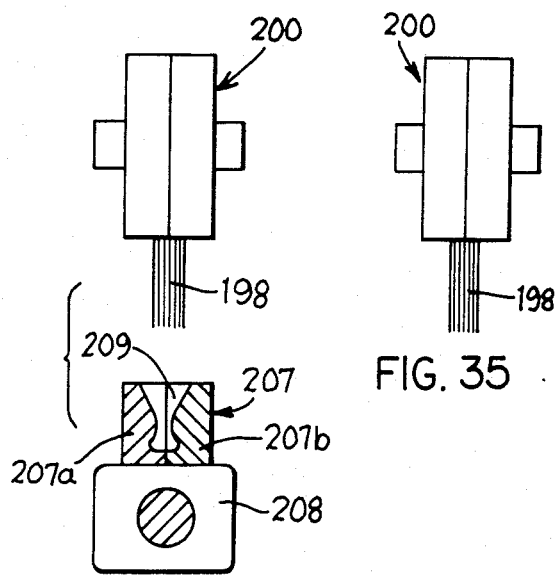
FIG. 35
FIG. 36

METHOD AND MACHINE FOR MANUFACTURING BRUSHES

FIELD OF THE INVENTION

The invention relates to a method and machine for manufacturing brushes and, more particularly, to a method and machine in which many bristle bunches, preferably all bristle bunches, of each brush are first transported through guide channels into a specific position relative to a brush member and are thereafter connected simultaneously at their connecting ends to the brush member.

BACKGROUND OF THE INVENTION

For clarification, it is remarked that, in the present connection, use of the term brushes is supposed to include all articles which have a body member needled with bristles, wherein the size is not important. Thus, the term brushes includes very small brushes, for example tooth brushes, and also large brushes, for example street brooms.

In the classic manufacture of brushes, bristles are removed from a magazine by means of a separator, are folded in a stuffing tool, and are secured by means of wire in predrilled holes of a relatively thick-walled brush member. Machines are used for this (German Pat. No. 1 114 463), with which brush members can be rotated into various positions in order to be able to place bores in any desired directions and in order to be able to insert bristle bunches into these bores by means of wire. The free bristle ends are subsequently sheared off and cleaned out. Machines of this type are manufactured as twin automatic machines in order to increase the performance, on which machines four operations (drilling, stuffing, shearing off and cleaning out) are simultaneously carried out two times.

The operating speed of such machines is limited because, with a complicated sequence of movement, the brush members must be moved into three planes, wherein considerable moment of inertia forces must be overcome. The limit of the operating speed lies at aproximately 300 sequences per minute, and cannot be exceeded because of the necessary precision for the drilled holes.

Also known is a machine (U.S. Pat. No. 3,604,043) with which bristles which consist of a thermoplastic material are connected by welding to a brush member which consists of the same thermo-plastic material. The machine has a bristle magazine in which bristles which are cut to length are stacked. Sleeves are placed through holes which exist in the magazine wall, which sleeves sit on a holder and are filled with bristles when being placed into the magazine. The connecting ends of the bristles are thereafter slightly melted by means of a heating element. The brush member is also slightly melted at the fastening regions for the bristle bunches by means of a heating element and is subsequently welded simultaneously to several bristle bunches. The brush member of brushes which are manufactured in this manner can be designed with relatively thin walls in order to save material. Disadvantageous, however, is that it is not possible with the method to manufacture brushes of any desired shape, for example round-head brushes with a bristles over a range of 180° or even 360°.

In a further conventional machine (U.S. Pat. No. 4,255,224), the brush member is moved into any desired position with the sequence of movement which is known from classic brush-manufacturing machines. The bristles which are cut to length are removed from the bristle magazine by means of a sleeve. The free ends of the bristles are slightly melted by means of a heating element, while at the same time the brush member is slightly melted with a different heating element at the intended fastening regions for the mentioned bristle bunches. After the heating element has swung out of the area between the brush member and bristle bunch, the bristle bunch is guided to the brush member and is welded thereto. With this, brushes of any desired shape with welded-on bristle bunches can be manufactured. The disadvantage of such machines lies in the expensive construction and the low output. In particular, the operating speed is limited, because a minimum amount of time is needed for welding on each bristle bunch, which minimum time is a multiple of the time needed for stuffing in a bristle bunch.

Also known is a method of the above-mentioned type (German Offenlegungsschrift No. 28 49 510) in which bristle bunches are either removed from a magazine of cut bristles or bristle bunches are separated from a strand and are guided through short guide channels to a brush member. The bristle bunches must here be gripped so that the individual bristles cannot separate from one another. With this, brushes can be manufactured in which the bristles point in various directions and all bristle bunches can be welded on simultaneously, so that a great manufacturing capacity is achieved. Of course, it is not possible with this method to secure bristle bunches in any desired direction on the brush member since, because of the necessity to hold the bunches together, the guide channels can only be short and therefore only small direction changes are possible.

Finally, a method is also known (German Offenlegungsschrift No. 29 22 877) in which bristle bunches are placed through a mold wall so that their connecting ends project into a mold cavity. The mold cavity is thereafter injected with a thermoplastic material for forming a brush member, wherein the bristle bunch ends which project into the mold cavity are enveloped by the injected plastic.

A basic purpose of the invention is to provide a method with which it is possible to efficiently manufacture brushes of any desired shape, for example brushes which are needled all around with bristles. A machine is also to be provided, with which this method can be carried out.

SUMMARY OF THE INVENTION

This purpose is attained according to the invention by a method which includes the steps of first manufacturing bristle bunches in which the individual bristles are connected with one another, and thereafter transporting the bristle bunches to the brush member and securing them thereon.

By connecting the bristles to one another, each bristle bunch is a connected unit which can be guided through a tubular conduit of any desired length without any danger that the bristle bunch will dissolve. Thus, a great freedom exists in placing the tubular conduits, so that the bristle bunches can be guided in any desired direction to the brush member. This makes it possible to manufacture brushes of any desired shape, for example brushes which are needled all around with bristles.

It is advantageous to connect the bristles of the bristle bunch with one another at both ends, because this makes handling of the bristle bunches easier, for example in a magazine.

The bristle bunches can be connected in various ways to the brush member. If the bristles consist of a thermoplastic material, they can be connected by welding to form one bristle bunch. It is also possible to injection mold plastic around their connecting ends. With this method, it is possible to connect bristles to a brush member to which they cannot be directly welded, if the plastic which is molded around the bristle bunches can be welded to the brush member.

The transport of the bristle bunches in the tubular conduits can be effected in various ways. Particularly simple is conveying them by means of pressurized air. In this case, the bristle bunches are moved similar to the containers in a tube-mailing system. Long distance paths can also be covered with this method, and the building expense of the needed machine is low. However, it is also possible to mechanically move the bristle bunches through the guide channels.

It is possible, as is known, to use brush members of a thermoplastic material and to soften the regions for attaching of the bristle bunches, before softened ends of the bristle bunches are pressed onto the brush member. A particularly good connecting point is obtained when the bristle bunches, during mounting, are compressed while the connecting ends are in a viscous state. The viscous state can be caused by the welding of the bristle bunches to one another and also can be produced by the finished bristle bunches being heated at their connecting ends immediately prior to the attachment. The compressing force can be produced dynamically by quickly moving the bristle bunches against the brush member. The force needed for the compressing can also be produced mechanically.

In a different method, the bristle bunches are positioned with their connecting ends in a mold cavity, and the brush member is then manufactured in the mold cavity. It is possible, as is actually known, to inject a thermoplastic material into the mold cavity. However, it is also possible to use a foaming plastic in the mold cavity. With this, a massive brush member is formed which consists of a porous material and has a low weight. Such brush members are particularly suitable for large brushes, for example brooms. Finally, it is also possible to introduce a casting resin into the mold cavity, which casting resin is hardened through a chemical reaction. A hollow brush member can also be formed in the mold cavity. For this, a blow-mold method and a swaging are suggested. Finally, it is possible to use for this the so-called rotation method, in which the mold is moved so that activated resin is brought into contact with all areas of the mold, wherein the activated synthetic resin plastic hardens. In all of these methods, the connecting ends of the bristle bunches are anchored in the brush member.

The mold cavity can be sealed off by the connecting ends of the bristle bunches being pressed against the ports of holes through which the bristle bunches project into the mold cavity. The bristle bunches can, prior to this, be axially fixed.

A connection betwen a bristle bunch and the brush member can occur by introducing the connecting ends of the bristle bunches into holes of a premanufactured brush member and thereafter creating a form lock against pulling out. The form lock can occur by narrowing the inlet ports of the holes. Ultrasound or friction can be used here for softening the brush-member material. It is also possible to introduce the bristle bunches into undercut holes and to thicken the connecting ends after they are inserted in order to create the form lock.

In an alternative form of the method, one starts out from a method described in German Offenlegungsschrift No. 28 49 510. By welding the bristles of a bristle bunch together, a good hold of the bristle bunch in the brush member is achieved since, through the thickening at the bristle bunch, a form lock is also created at the brush member.

In one form of a machine for manufacturing brushes according to the mentioned method, premanufactured brush members are connected to bristle bunches. In another form of the machine, at the time the brush member is manufactured, the anchoring of the bristle bunches in the brush member occurs.

These machines include devices with which bristle bunches are distributed in the machine to various tubular conduits, devices for the transport of the bristle bunches within the tubular conduits, and devices for manufacturing bristle bunches.

BRIEF DESCRIPTION OF THE DRAWINGS

Exemplary embodiments of the invention are illustrated in the drawings, which are diagrammatic and in which:

FIG. 1 is a diagrammatic view of a brush manufacturing machine embodying the invention, with which bristle bunches are mounted on premanufactured brush members;

FIG. 2 is a diagrammatic view of a brush-manufacturing machine similar to that of FIG. 1 for manufacturing a brush which has bristles over a large peripheral angle;

FIG. 3 is a side view of a brush which is manufactured by the machine according to FIG. 2;

FIG. 13 is a side view of a bristle bunch with a welded-together connecting end;

FIG. 14 is a fragmentary sectional side view of the machine of FIG. 11 during a phase of operation directly following the introduction of the bristle bunches;

FIG. 15 is a fragmentary sectional view similar to FIG. 14 of the machine according to FIG. 11 during a different phase of operation in which the bristle bunches are clamped and their connecting ends are upset;

FIG. 16 is a fragmentary sectional side view of a modified version of the machine of FIG. 11 during a phase of operation in which the mold is already open;

FIG. 17 is a fragmentary sectional side view of a die-casting machine according to the invention in which the brush members are formed from a thermoplastic material, in which the bristle bunches are moved by means of flexible mechanical slide members, and in which the bristle bunches are initially held in a strap;

FIG. 18 is a fragmentary side view partly in section, of a further inventive brush-manufacturing machine in which brush members are formed of a foamed plastic and form-lockingly envelop the bristle bunches;

FIG. 20 is an end view of a connecting end of a bristle bunch;

FIGS. 21 to 24 are fragmentary sectional side views of a brush which show respective phases of a method in which bristle bunches are inserted into undercut holes of a brush member and are then enlarged within the undercut holes;

FIGS. 25 to 27 are sectional side views of a brush which show respective phases of a method in which bristle bunches are inserted into holes of the brush member and the inlet ends of the holes are subsequently narrowed down in order to achieve a form-locking hold of the bristle bunches;

FIG. 33 is a side view of an inventive device for manufacturing bristle bunches, with which bristle bunches are cut off from a strand of many bristles;

FIG. 34 is an end view of the device according to FIG. 33, taken in the direction of the arrow XXXIV in FIG. 33;

FIG. 35 is a top view of a clamping mechanism which is a component of the device of FIG. 33 and holds a cut off bristle bunch;

FIG. 36 shows the clamping mechanism according to FIG. 35 and also shows, partly in section, a device for connecting bristles of a bristle bunch;

FIG. 37 is a sectional view of the clamping mechanism according to FIG. 35 and also shows an arrangement for conveying bristle bunches;

DETAILED DESCRIPTION

Figure 4:
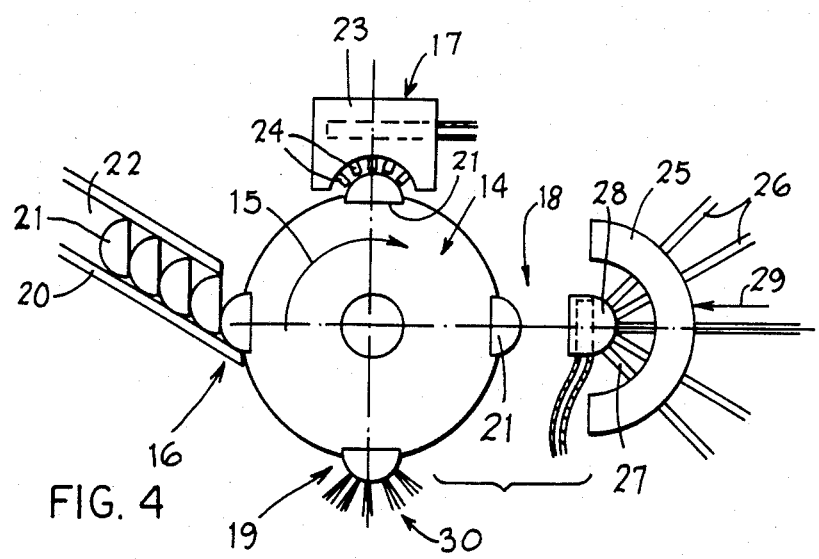
FIG. 4 is a diagrammatic view of a further inventive machine for manufacturing brushes which has a turntable and in which the bristle bunches, after having been moved into a bristle bunch holder are softened.

The brush-manufacturing machine according to FIG. 1 has a magazine 1 for bristle bunches, a distributor block 2, tubular conduits 3 which start out at the distributor block 2, a bristle bunch holder 4, a heating device 5 for softening selected areas of brush members 7 and a magazine 6 for the brush members 7.

Brushes are manufactured as follows with this machine. Brush members 7 are removed from the magazine 6 and are guided to the heating device 5. The heating device 5 has several heating elements 8 which are positionally arranged to correspond with the respective fastening points for bristle bunches. The heating element 8 then softens these selected areas of the brush member 7, which is made of a thermoplastic material. The brush member 7 is then moved to the bristle bunch holder 4. Several bristle bunches 9 are moved simultaneously to the bristle bunch holder through the tubular conduits 3 with their connecting ends facing toward the brush member 7. The connecting ends of the bristle bunches are preferably softened, so that a good welding of the bristle bunches 9 to the corresponding areas on the brush member 7 is effected. After the connections between the brush member 7 and bristle bunches 9 have sufficiently hardened, the bristle-bunch holder 4 is moved back, after which the brush is removed.

The brush-manufacturing machine according to FIG. 2 works much like the machine according to FIG. 1. The tubular conduits, which are here identified with reference numeral 3', also start out from a distributor block 2' and lead to a bristle bunch holder 4'. The bristle bunch holder 4' differs from the bristle bunch holder 4 according to FIG. 1, in that it extends over an angle of 180°, while the bristle bunch holder 4 according to FIG. 1 extends over an angle of only 90°. The tubular conduits 3' must therefor effect substantially larger directional changes for the bristle bunches, which is easily possible because the bristle bunches, due to connection of the individual bristles among one another, cannot dissolve even while moving over long distances.

Figure 6:
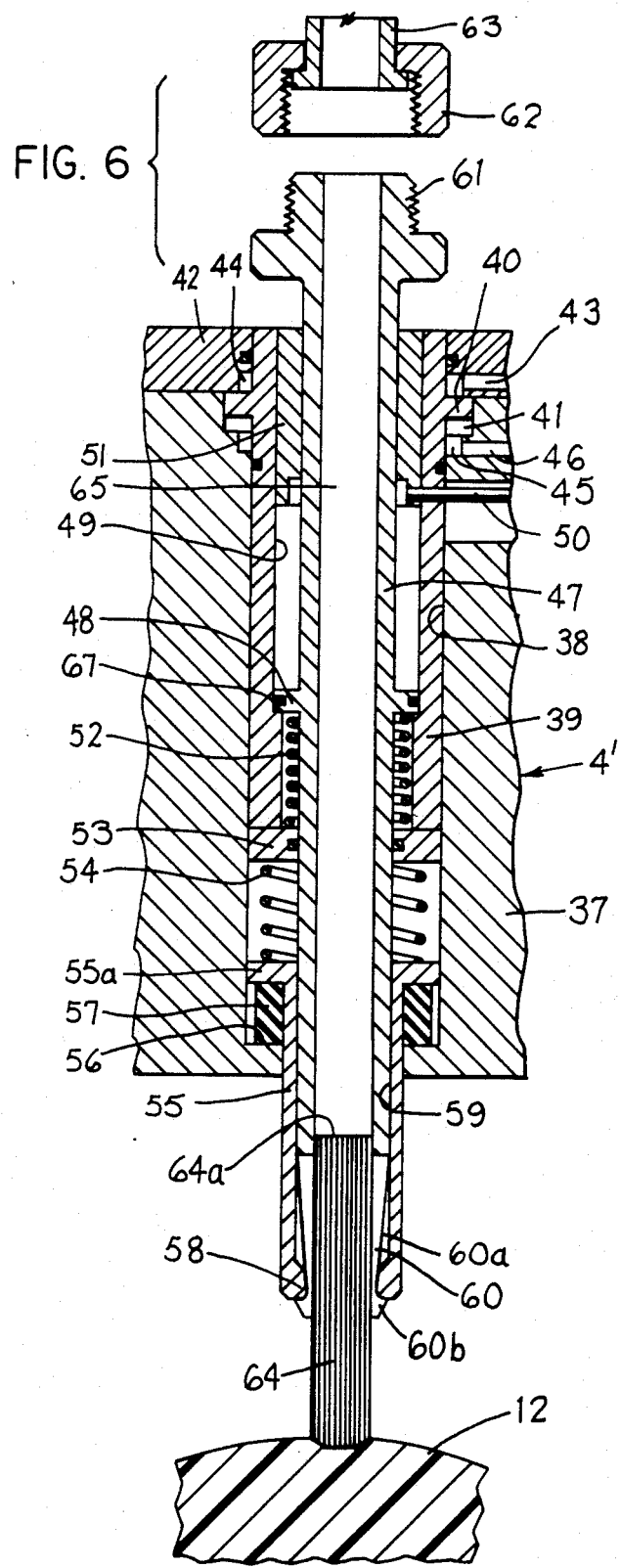
FIG. 6 is a longitudinal sectional side view of a longitudinally movable nozzle for handling bristle bunches in a machine of the type shown in FIG. 2.

While it is possible after the manufacture of a brush according to FIG. 1 to pull the bristle bunches out of the bristle bunch holder 4 by merely moving away the brush member 7, this is not easily possible during the manufacture of a brush according to FIG. 3 using the machine of FIG. 2. The bristle bunch holder 4' therefore contains axially movable nozzles 10 which can each be pulled back to release the associated bristle bunch. The nozzle 10 is illustrated in detail in FIG. 6 and will be discussed later on. The construction of the distributor block 2' and associated elements which are also illustrated in FIG. 2 will be discussed later in connection with FIGS. 9 and 10.

A brush-manufacturing machine according to FIG. 2 can, because of the great freedom in positioning the tubular conduits, be modified for the manufacture of round brushes which have bristle bunches distributed over an angle of 360°.

The tubular conduits 3 and 3' can be rigid tubes or flexible hoses. It is also possible to combine flexible hoses and rigid tubes with one another in one tubular conduit.

The brush-manufacturing machine according to FIG. 4 has a drum 14 which can be rotated in the direction of the arrow 15 with rotary steps of 90°. Four stations are arranged on the periphery of the drum 14, namely a feed station 16 for brush members 21 a heating station 17 for softening selected areas of the brush members, a fastening station 18 in which softened bristle bunches are secured on the heated brush member, and an ejecting station 19 in which the finished brushes are ejected.

A magazine 20 for the brush members 21 is provided in the feed station 16, the brush members sliding in the inclined magazine chute 22 toward the drum 24 through the effect of gravity. One brush member 21 is clamped there each time the drum 24 has rotated 90°. After a 90° rotation of the drum, the brush member 21 reaches the heating station 17, in which is provided a heating device 23 which in turn is equipped with individual heating elements 24 for heating selected areas of the brush member 21, as has already been described in connection with FIG. 1 (the heating device 5 with heating elements 8).

The heated brush member 21 is moved to the fastening station 18 through a further 90° rotary step of the drum. A bristle bunch holder 25 is provided in the fastening station, to which holder are guided tubular conduits 26 which communicate with nozzles 27. The bristle bunches which are held in the nozzles 27 are softened at their connecting ends by means of a heating device 28. The heating device 28 is removed after the softening, and the bristle bunch holder 25 is then moved in the direction of the arrow 29 by means of a not illustrated moving mechanism, namely, in a direction toward the brush member 21. The operations are adjusted timewise to one another so that the heated areas of the brush member are still softened when the softened ends of the bristle bunches come into contact with the brush member 21.

After the bristle bunches are sufficiently securely attached to the brush member 21, the bristle bunch holder 25 is pulled back after axially movable nozzles 27 are moved relative to the bristle bunch holder 25 so as to release the bristles. During a further rotary step of 90°, the finished brush 30 moves into the ejecting station and is there ejected.

For clarification, it is remarked that, at all times, all four stations are in operation simultaneously, so that the described cycle does not run to completion before a new brush member is removed from the magazine 20 by the drum, but instead so that simultaneously one brush member is clamped, one brush member is heated, one brush member has bristle bunches secured thereto, and one finished brush is ejected.

Figure 5:
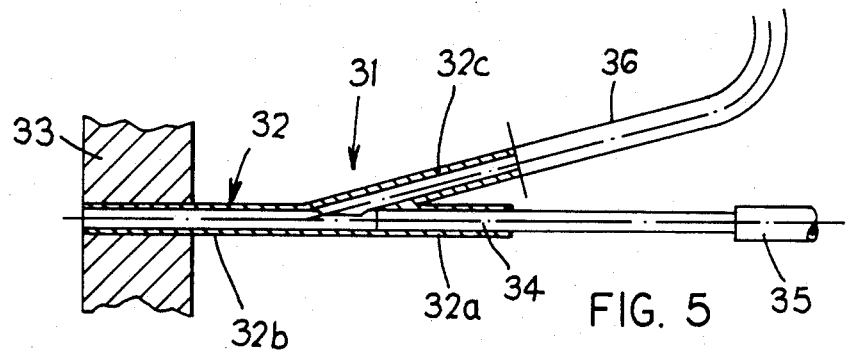
FIG. 5 is a diagrammatic sectional side view of a tubular conduit for guiding bristle bunches combined with a mechanical slide member.

FIG. 5 illustrates an end portion of a tubular conduit 31 for conveying bristle bunches. A Y-shaped end piece 32 of the tubular conduit is constructed rigidly and is secured on a bristle bunch holder 33. The end piece 32 has a connecting piece 32a which is in alignment with a front part 32b of the end piece 32. The front part 32b passes rearwardly over into a conduit part 32c which is inclined with respect to the front section 32b. A rod 34 is slidably supported in the connecting piece 32a, which rod 34 is coupled to a fluid actuated cylinder 35 which can move the rod 34 axially back and forth. A hose or a rigid conduit part 36 is connected to the conduit part 32c.

The operation with tubular conduits 31 takes place as follows. Bristle bunches are moved through the hose 36 and the conduit part 32c by pressurized air and into the conduit part 32b. When a bristle bunch has arrived in the conduit part 32b, it can be mechanically pressed forwardly by moving the rod 34 forward, in order to press the bristle bunch with an exactly defined force onto a heating element and thereafter onto a brush member. The device according to FIG. 5 has the advantage that bristle bunches can be moved by means of pressurized air over a path of any desired length, and in spite of this a defined pressure on a brush member is still possible.

During the discussion of FIG. 2, axially movable nozzles for the bristle bunches were mentioned. Such a nozzle will now be described in connection with FIG. 6. A bore 38 is provided in a base member 37 of the bristle bunch holder 4' (see FIG. 2), in which bore a sleeve 39 can slide. The sleeve 39 has in an upper portion a flange 40 which acts as a piston and is movable in a short piston chamber or cylinder 41 which is machined into the base member 37. A lid 42 is provided on the upper side of the base member 37. An air-inlet bore 43 is provided within the lid 42 and ends in a chamber 44 which communicates with the cylinder 41. A chamber 45, into which ends an air channel 46, is provided below the cylinder 41 and communicates therewith.

A further sleeve 47 is axially movably supported in the sleeve 39. A flangelike piston 48 is provided on the sleeve 47 and is slidable in a piston chamber or cylinder 49. An air channel 50 ends in the cylinder 49. The cylinder 49 is closed off upwardly by a guide sleeve 51 in which the sleeve 47 is slidably guided.

Below the piston 48, the sleeve 39 is surrounded by a compression spring 52 which, with its upper end, is supported on the piston 48 and, with its lower end, is supported on a lid 53 which is screwed to the lower end of the sleeve 39. A compression spring 54 has its upper end supported on the lid 53 and its lower end supported on a flange 55a of a sleeve 55. The spring 54 thus tries to press the sleeve 39 upwardly until the piston 40 rests on the lid 42.

A buffer member 57 of an elastomeric material is inserted between the flange 55a and a shoulder 56 on base member 37. The sleeve 55 projects from the base member 37 of the bristle bunch holder 4' and has at its lower end a beadlike thickened portion 58 which narrows the sleeve bore 59 at its lower end. The thickened area 58 is designed to cooperate with inclined surfaces 60a provided on several elastically flexible, axially projecting tongues 60 which are in turn provided around the periphery of the sleeve 47. The tongues 60 each have at their lower end an outwardly projecting thickened portion 60b, which forms a stop which cooperates with the thickened portion 58 of the sleeve 55.

A screw thread 61 is provided at the upper end of the sleeve 47, onto which can be screwed a screw nut 62 provided at the end of a tubular conduit 63.

The nozzle operates as follows. A bristle bunch 64 is moved by means of pressurized air through the channel 65 provided in the sleeve 47 until it rests on the brush member 12. During this operation, the chamber 49 is supplied with pressurized air, which causes the spring 52 to be kept compressed and the piston 48 to be held on a shoulder 67 at the lower end of the chamber 49. The piston 40 and thus the sleeve 39 are in their uppermost position.

To clamp the bristle bunch 64, pressurized air is supplied through the channel 43 and tries to press the sleeve 39 downwardly. The sleeve 47 is hereby carried along so that it carries out a movement relative to the sleeve 55. Through this, the inclined surfaces 60a of the tongues move relative to the thickened portions 58, so that the tongues 60, which together form a collet, are pressed against the periphery of the bristle bunch 64. The bristle bunch 64 is thus connected to the sleeve 47 by clamping. This clamping is created after only a short path of movement. Further downward movement of the sleeve 39 then effects a mechanical pressing of the bristle bunch 64 onto the brush member 12, which results in a good welding.

To subsequently release the bristle bunch 64, the cylinder chamber 49 is relieved of pressurized air by discharging it through the channel 50. The spring 52 now presses the sleeve 47 upwardly within the sleeve 39, whereby the sleeve 55 is carried along after the thickened portions 60b of the tongues 60 engage the thickened portion 58 of the sleeve 55, causing the spring 54 to be compressed. The clamping of the bristle bunch 64 was thereby also cancelled. The sleeve 55 is pulled into the base member 37 sufficiently far so that the lower ends 60b of the tongues 60 lie slightly above the upper end 64a of the bristle bunch 64. The upward movement can, if desired, be enlarged yet a little more by pressurizing chamber 41 through the air channel 46.

Due to the pull-back capacity of the nozzle 10, the bristle bunches are thus completely released, so that the removal of the brush 12 from the bristle bunch holder (see FIG. 2) presents no problems. The removal of the brush is, in particular, not hindered by the horizontal nozzles 10.

Figure 7:
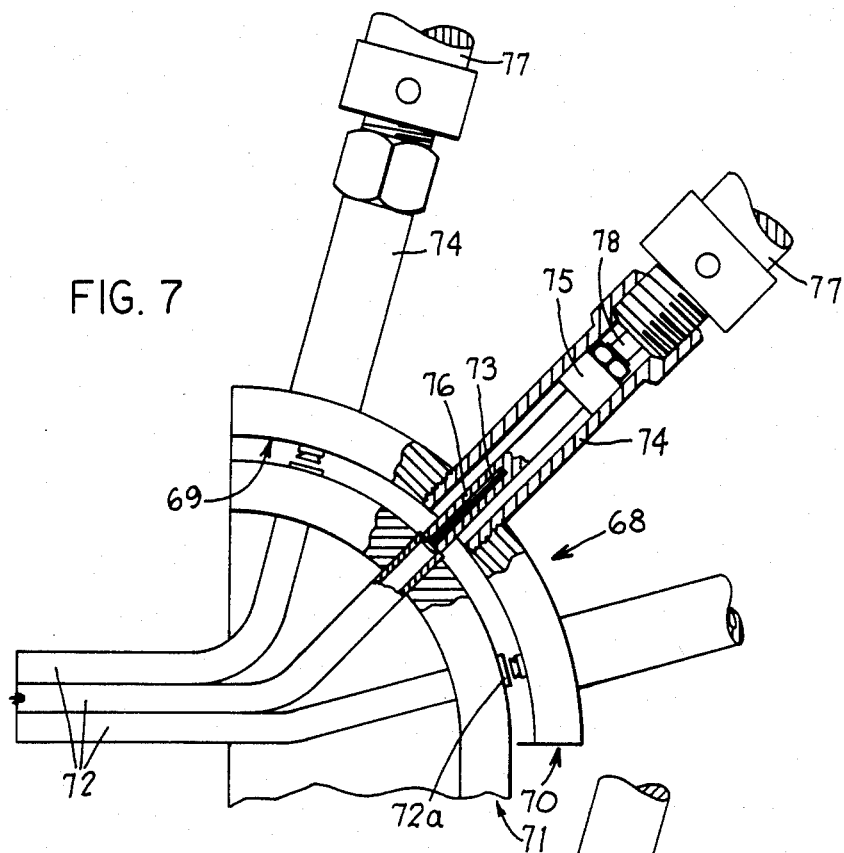
FIG. 7 is a fragmentary side view of a further inventive machine having a concave bristle bunch holder which can be supplied from its inside with bristle bunches.
Figure 8:
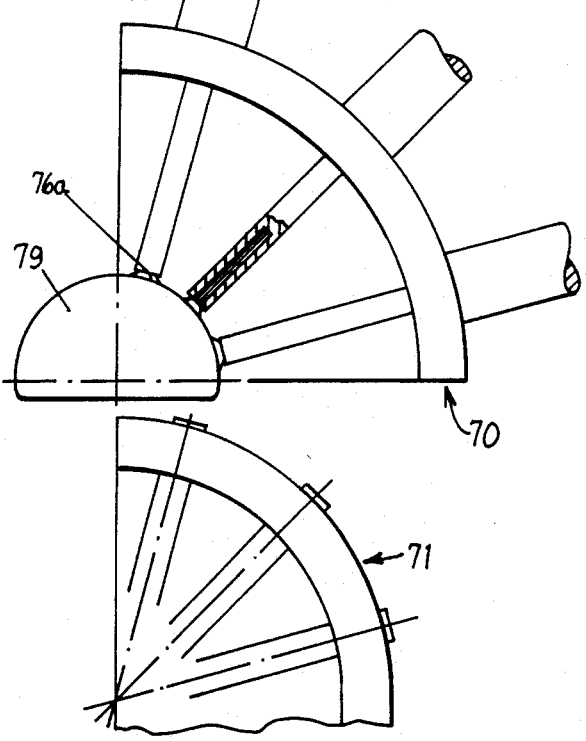
FIG. 8 is a view similar to FIG. 7 showing the bristle bunch holder according to FIG. 7 in a different operational position.

The bristle bunch holder in FIGS. 7 and 8, which is identified as a whole with reference number 68, unlike the already described bristle bunch holders 4 and 4', is not loaded with bristle bunches from the outside, but instead from the inside, namely, in a radially outward direction toward a concave surface 69 of the bristle bunch holder. The bristle bunch holder 68 has a holding part 70 and a loading part 71. Several tubular conduits 72 for supplying bristle bunches 73 are connected to the loading part 71. Several holding members 74 are provided on the holding part 70 and each form a guide cylinder for a guide member 75. The guide member 75 is connected to a sleeve 76 in which a bristle bunch 73 can be received.

A double-acting fluid actuated cylinder 77, preferably a pneumatic cylinder, is attached to the rear end of each holding member 74, from which cylinder 77 projects a piston rod 78 which is connected to the guide member 75. The sleeve 76 can be moved back and forth within the holding member 74 by the double-acting cylinder 77.

During the feeding of the bristle bunches through the conduits 72, the loading part 71 is aligned with the holding part 70, as shown in FIG. 7, so that each sleeve 76 is aligned with a port 72a of a respective tube 72. The sleeves 76 are, in this phase, pulled as far as possible into the holding members 74 by the cylinders 77. When all sleeves 76 have been supplied with bristle bunches 73, the loading part 71 is moved away from the holding part 70, as illustrated in FIG. 8. A heating device 79 is then moved into the holding part 70. All sleeves 76 are now moved out (radially inwardly) by means of the cylinders 77, which causes the front ends 76a of the bristle bunches 73 to come into contact with the heating element 79, and the front ends of the bristle bunches are thus softened. After the softening, the sleeves 76 can again be moved into the holding members 74, after which a brush member which has been softened at selected locations for attaching bristle bunches is moved into the holding part 70 in place of the heating element 79. The bristle bunches, which are still softened at their connecting ends 76a, are thereafter welded to the softened areas of the brush member through pressure and cooling, for which purpose the sleeves 76 are again moved out of the holding members 74.

The bristle bunch holder 25 according to FIG. 4 can be designed according to FIGS. 7 and 8.

The distributor block 2', which has already been mentioned during the description of the machine according to FIG. 2, will be described in detail hereinafter in connection with FIGS. 9 and 10. The distributor block 2' has a housing 80, in which are provided several vertical chutes 81. The width of each chute 81 is only slightly larger than the diameter of the bristle bunches 13. The chutes 81 are open in an upward direction. A funnel-shaped magazine 1' can be moved along the top surface 80a of the housing 80 and has a lower opening 82 which can be aligned with the chutes 81, whereby bristle bunches fall into the chute which is below the opening 82.

Figure 9:
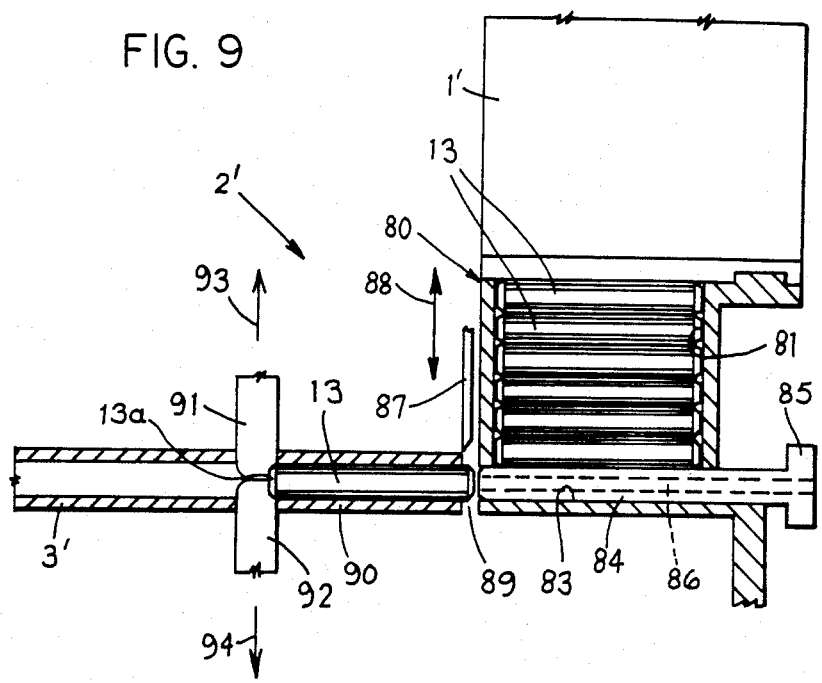
FIG. 9 is a vertical sectional view of an inventive distributor block and magazine, taken along the line IX—IX in FIG. 10.
Figure 10:
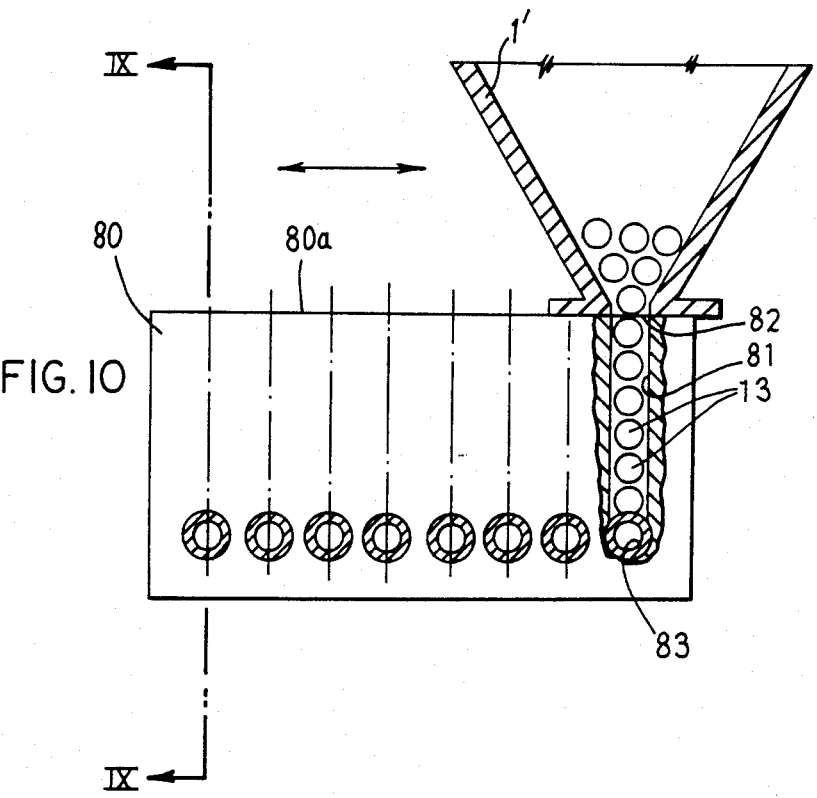
FIG. 10 is a fragmentary sectional view of the distributor block of FIG. 9, including the magazine which is associated with the distributor block.

A bore 83 is provided at the lower end of each chute 81, which bore 83 extends completely through the housing 80 (see FIG. 9). A ram 84 is movable in each bore 83. All rams are fixedly connected by a transverse bar 85. An axial channel 86 is provided through each ram 84.

A knife 87 is provided at the output side of the housing 80 and is movable vertically in directions corresponding with the arrow 88. The knife 47 can move into a gap 89 between the housing 80 and plural guide sleeves 90, the guide sleeves 90 each being aligned with a respective bore 83. The conduits 3' are aligned with and spaced a certain distance from the guide sleeves 90. Heating elements 91 and 92 can be moved into the space between the guide sleeve 90 and the conduits 3'.

The bristle bunches 13 which are in the magazine 1' and in the chutes 81 have previously been welded together at both ends, which prevents spreading of the bristles and makes handling of the bristle bunches substantially easier.

When several bristle bunches are supposed to be supplied to the bristle bunch holder 4' (FIG. 2) through the conduits 3', the rams 84 are simultaneously pushed leftwardly into the bores 83 and thereby move the bristle bunches 13 into engagement with the heating elements 91 and 92, which have been moved into the heating position shown in FIG. 9. The connecting ends 13a are in this manner softened. The knife 87 at the same time moves downwardly and cuts off the welded rear end of the bristle bunches 13, so that the bristles are no longer connected with one another at this end.

After a subsequent outward movement of the heating elements 91 and 92, corresponding with the arrows 93 and 94, further movement of the bristle bunches is effected by blowing air through the cannel 86. The bristle bunches are thus moved to the brush member sufficiently quickly so that the connecting ends 13a are still softened when the bristle bunches hit the brush member 12. Thus, in this case, the bristle bunches are softened prior to being transported to the bristle bunch holder 4' or 4, while in the embodiments according to FIGS. 4, 7 and 8, the softening occurs after the bristle bunches are already in the bristle bunch holder.

Machines have been described above with which bristle bunches can be attached to premanufactured brush members. Machines will be described hereinafter, in connection with FIGS. 11 to 19, with which the brush member itself is manufactured from a moldable material by the brush-manufacturing machine.

Figure 11:
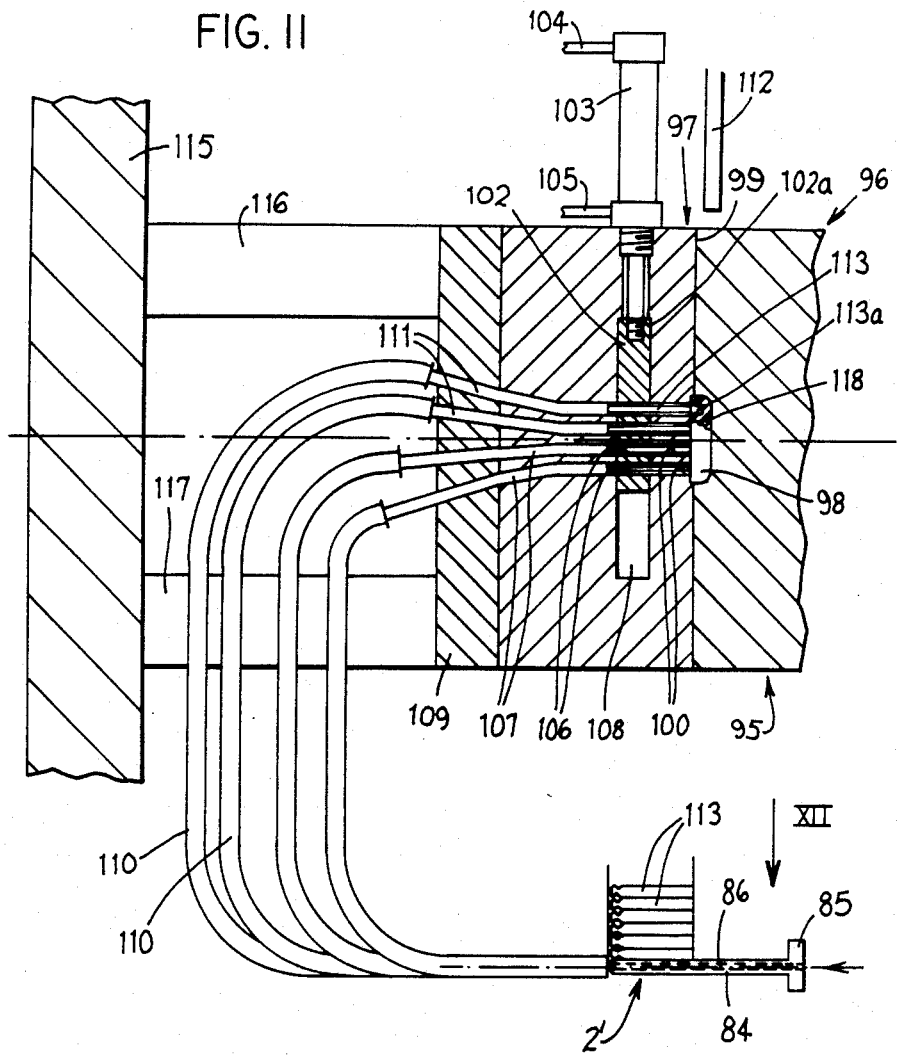
FIG. 11 is a diagrammatic sectional side view of a further brush-manufacturing machine according to the invention which is constructed as a die-casting tool, in which the brush member is formed from a thermoplastic material and form-lockingly envelops the bristle bunches at their connecting ends.

FIG. 11 is a diagrammatic partial illustration of a die mold for the manufacture of brushes. The die mold, which as a whole is identified with reference numeral 95, has mold parts 96 and 97 which together define a mold cavity 98. The mold cavity 98 can be opened by moving the mold parts 96 and 97 away from one another. The separating plane between the mold parts 96 and 97 is identified with reference numeral 99.

Plural bores 100 for receiving bristle bunches 113 are provided in the mold part 97. Also, a slide member 102 is movable in the mold part 97 by means of a double-acting fluid actuated cylinder 103, which can be supplied with a pressurized fluid through conduits 104 and 105. Plural bores 106 are provided in the slide member 102, which bores 106 have their ends provided on the slide member side 102a aligned with the bores 100 in an upper position of the slide member 102. Further bores 107 are provided in the mold part 97, which bores 107 end in the cavity 108 in which the slide member 102 is movable. The bores 106 can also be aligned with the bores 107 so that the bores 107, 106 and 100 together form continuous channels.

The machine has a connecting plate 109, to which tubular conduits 110 are guided. Bores 111, which each communicate with a respective bore 107 in the mold part 97, are provided in the connecting plate 109.

Figure 12:
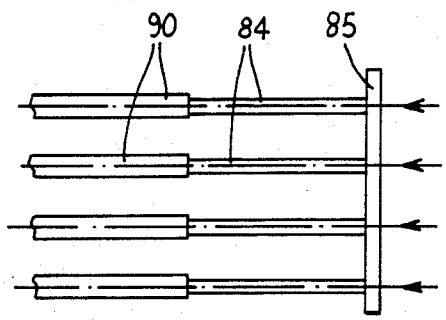
FIG. 12 is a top view of selected components of a bristle bunch distributor in FIG. 11, taken in the direction of the arrow VII in FIG. 11.

Also, a distributor block 2' is part of the machine, which distributor block 2' is constructed as described in connection with FIGS. 9 and 10 and is illustrated diagrammatically. The transverse bar 85, which was mentioned already in connection with FIG. 9, is visible in FIG. 12. FIGS. 11 and 12 show some reference numerals which also appear in FIGS. 9 and 10.

The machine also includes a stop slide member 112 which is discussed hereinafter in connection with FIGS. 14 and 15. The stop slide member 112 can be moved to a positon between the mold parts when the mold is open, namely, when the mold parts 96 and 97 are spaced from one another. The stop slide member 112 has a stop surface 112a thereon which the bristle bunches 113 can engage. The stop slide member 112 can also be moved in the direction of the double arrow 114 (FIG. 15), which causes the distance of the stop surface 112a from the mold part 97 to be changed, as will be discussed later during the description of the operation of this machine.

The conventional die-casting machine into which the mold is inserted is not illustrated in FIG. 11. What is shown is a die carrier plate 115 and spacers 116 and 117 which keep the mold 95 spaced from the carrier plate 115 in order to create space for the tubular conduits 110.

This machine operates as follows. When the mold is open, the stop slide member 112 is moved relative to the mold part 97 to the position illustrated in FIG. 14. The stop surface 112a is spaced by a distance a from the surface 97a of the mold part 97. The slide member 102 is in its upper position, in which its bores 106 are aligned with the bores 107 and 100, as is illustrated in FIGS. 11 and 14. The bristle bunches 113 which are to be moved into the mold have the shape illustrated in FIG. 13 with a welded connecting end 113a, the diameter of which is not larger than the diameter of the bristle bunch. The connecting end 113a is mushroom-shaped, the mushroom head having a diameter which preferably is approximately equal to the diameter of the bristle bunch. The bristle bunches are moved until they hit the stop surface 112a Then the bristle bunches are clamped, for which purpose the slide member 102 is urged downwardly to the position according to FIG. 15 with the help of the fluid actuated cylinder 103. In order that the bristle bunches 113 are not sheared thereby, sloped surfaces 107a are arranged at the ends of the bores 107, sloped surfaces 106a and 106b are provided at opposite ends of the bores 106, and sloped surfaces 100a are provided at the ends of the bores 100. After this clamping is effective, the slide member 112a is moved in the direction of the surface 97a, whereby the distance between the stop surface 112a and the mold surface 97a is reduced to the dimension b (FIG. 15). The connecting ends 113a of the bristle bunches are hereby axially compressed, as can easily be seen from a comparison of FIGS. 14 and 15. The diameter of the connecting ends 113a is thereby enlarged from the dimension c (FIG. 14) to the dimension d (FIG. 15). A good sealing of the ends of the bores 100 at the mold surface 97a thereby takes place.

The connecting ends 113a of the bristle bunches can still be softened from being heated up at the distributor block 2' in the manner described in connection with FIG. 9. Alternatively, the stop slide member 112 can be heated, so that the softening occurs when the bristle bunches are already moved into and clamped in the mold (FIG. 15).

After compressing the connecting ends 113a, the slide member 112 is moved out of the mold and the mold is closed. A thermoplastic material is then injected into the mold cavity 98, whereby a brush member is created which envelops the connecting ends 113a of the bristle bunches 113. When the brush member 118 has sufficiently cooled and hardened, the mold is opened and the finished brush is ejected.

FIG. 16 shows an alternative arrangement for clamping the bristle bunches 113. In this case, the slide member, which is here identified with reference numeral 102', is moved into such a position that its bores 106' are laterally offset with respect to connecting bores 107' and 100'. The bristle bunch 113 then has its rear end 113b resting against the slide member surface 102'a and is thus prevented from moving leftwardly.

The guide channels 100' have enlargements 241 near their ends, into which the softened, still deformable material of the bristle bunches is pressed, which causes a particularly good seal.

FIG. 17 illustrates a further machine with which brush members are manufactured within a die mold 119. The die mold 119 has mold parts 120 and 121 which can be separated from one another in a direction perpendicular to the dividing plane 122. The mold parts 120 and 121 define a mold cavity 123 in which a brush member 124 can be formed.

Bores 125, to which tubular conduits 126 can be connected, are provided in the mold part 120.

A flexible slide member 127 is associated with each tubular conduit 126, which slide member 127 can be axially moved in the associated tubular conduit 126 by means of a fluid actuated cylinder 128. It can also be pulled completely out of the tubular conduit. The completely pulled-back position is illustrated for the three slide members 127 at the left side of FIG. 17.

Bristle bunches 130 are held in a movable magazine strap 129 and can be aligned with the ports 126a of the conduits 126. After aligment, the slide members 127 are, with the mold open, moved forwardly and push the bristle bunches 130 through the conduits 126 and into the mold 119. There, a not-illustrated stop slide member similar to the stop slide member 112 of FIGS. 11 to 15 can be provided to limit the moving-in depth. In this case, clamping of the bristle bunch in the manner illustrated in FIG. 15 or movement of a stop in the manner illustrated in FIG. 16 is not necessary, since the mechanical slide members 127 prevent any retreating of the bristle bunches 130.

Figure 19:
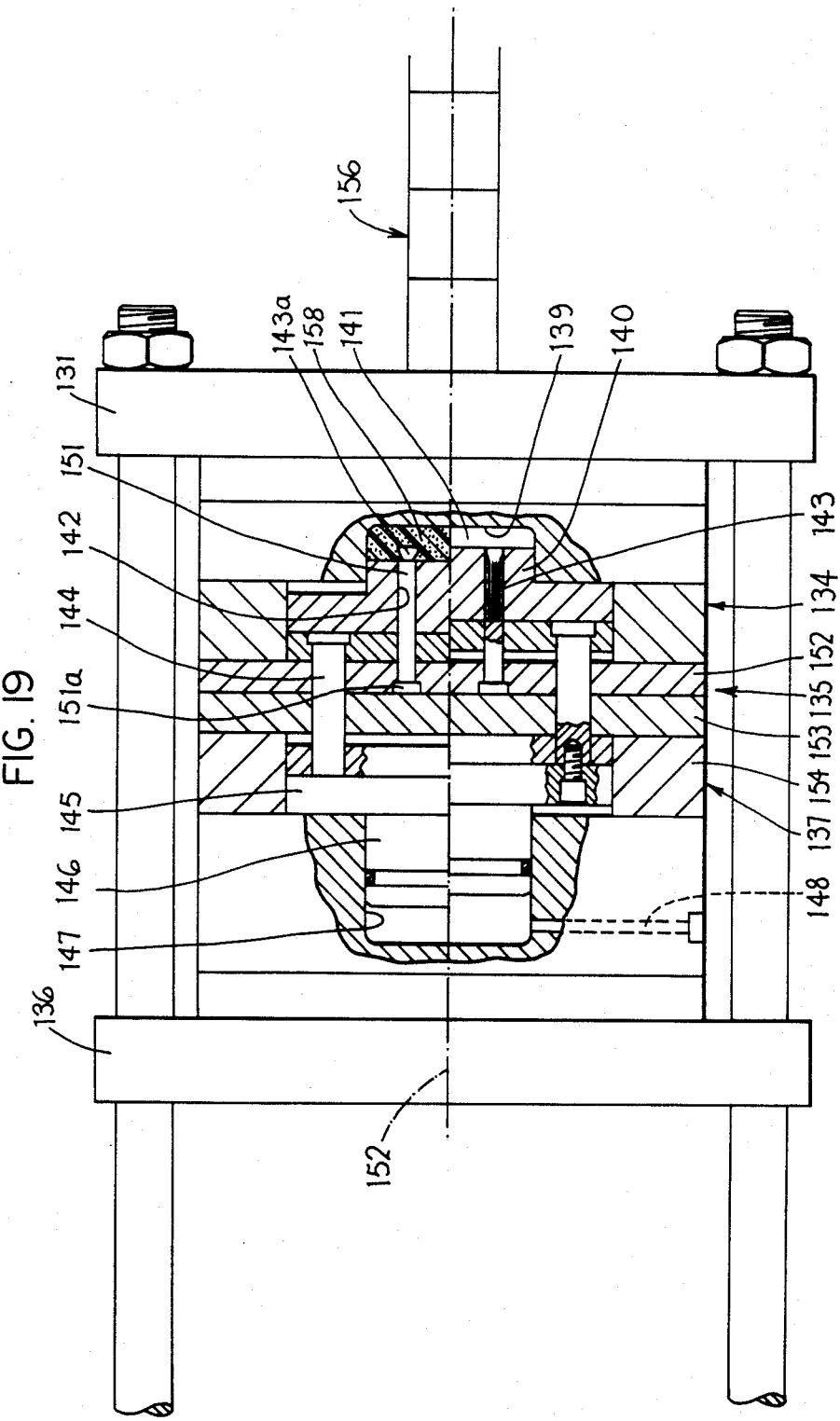
FIG. 19 is a fragmentary side view similar to FIG. 18 showing the machine according to FIG. 18 in a different phase of operation.

FIGS. 18 and 19 illustrate a brush-manufacturing machine in which brush members are manufactured by foaming plastic. An important part of the machine is a die-casting tool.

The machine has a support 131 to which guide rods 132 and 133 are connected. A first mold part 134 of a foam mold, which as a whole is identified with reference numeral 135, is secured on the support 131. A support 136 is supported for movement along the guide rods 132 and 133 on which support 136 is secured a second mold part 137 of the foam mold 135. A loading block 138 can be moved to a position between the mold parts 134 and 137 when the mold parts are separated from one another (FIG. 18).

The mold part 134 is constructed simply. It contains only a recess 139. A projection 140 of the mold part 137 can move like a piston into the recess 139, as shown in FIG. 19, which permits the volume of the mold cavity 141 to be changeable. The projection 140 contains bores 142 having receiving sleeves 151 therein in which bristle bunches 143 can be received. The sleeves 151 have heads 151a which are held between plates 152 and 153.

The projection 140 is movable relative to the plates 152 and 153. The projection 140 is connected for this purpose by rods 144 and a member 145 to a piston 146 which can slide within a cylinder bore 147. A pressurized fluid, preferably hydraulic oil, can be introduced through a channel 148 into the cylinder bore 147.

The plates 152 and 153 are connected to a further plate 154 having an opening within which the member 145 is movable.

Many bores 149 (FIG. 18) are arranged in the loading block 138. One tubular conduit 150 each is aligned with each of the bores 149 in FIG. 18. The arrangement of the bores 149 corresponds with the arrangement of the bores 142 in the projection 140. A movable rod 155 is connected to the loading block 138 and can move the loading block into and out of the opened mold.

An injection head 156 is also part of the machine, and can inject into the mold cavity 141 a thermoplastic material and a foaming supplement which react with one another to create a plastic foam.

The machine operates as follows. First, with the mold open (FIG. 18), the loading block 138 is moved between the mold parts 134 and 135. The projection 140 is in an advanced position which in FIG. 19 is illustrated below the centerline 157. When all sleeves 151 have been filled with bristle bunches 143 via the conduits 150, the loading block 138 is moved out of the mold. The mold is now closed, for which purpose the support 136 and the parts of the mold secured thereon are moved in the direction of the stationary support 131. The injection head 156 is now moved to the mold 135 and the mold cavity 141 is filled with the two plastic components, which produce for example polypropylene and nitrogen or carbon dioxide as a propellant. The projection 140 is initially still in the advanced position which is illustrated below the centerline 157. The connecting ends 143a of the bristle bunches are through this disposed within the bores 142. The injected plastic, which flows in with a high speed, therefore cannot flush the bristle bunches out of the bores 142. When the propellant becomes active, an expanding pressure is created, through which the projection 140 is pressed into a retracted position which is illustrated above the dash-dotted centerline 157 in FIG. 19. The flow of plastic within the mold is no longer taking place during this movement.

As is illustrated in FIG. 18, the bores 142 are enlarged at their ends near the surface 140a of the projection 140. The enlarged portions are identified with reference numeral 142. The supplied bristle bunches 143 have a connecting end 143a which also is enlarged toward the base surface. Through this, the connecting ends 143a are form-lockingly enveloped as the brush member 158 is formed.

When the brush member 158 is sufficiently hardened, the mold 135 is opened and the finished brush is ejected.

FIGS. 20 to 24 illustrate a method in which one proceeds as follows. Premanufactured brush members 159 are used, in which holes 160 are formed. Ring-shaped elevations 161 are provided at the upper hole edges. In a first method step, the ports of the holes 160 are narrowed down, for which purpose the thermoplastic material of the brush member 159 is heated. The holes 160 thus receive ports 162 which are substantially smaller than the hole cross sections therebelow. Connecting ends 163a of bristle bunches 163 are moved at a high speed through the narrowed-down ports 162. The connecting ends are previously softened so that, upon hitting the base of the holes 160, the connecting ends are compressed and fill the holes 160. This final state is illustrated in FIG. 24.

The connecting ends 163a advantageously have the cross section which can be seen from FIG. 20. This cross section has the advantage that large material accumulations are avoided and thus a quick softening of the bristle bunches is possible even though the thermoplastic material has a low heat conductivity.

FIGS. 25 to 27 illustrate a modified method in which brush members 164' having holes 160' are used. In contrast to the method described in connection with FIGS. 20 to 24, however, the bristle bunches 165 have their connecting ends 165a introduced into the holes 160' prior to the holes being narrowed down at their ports. The ports are narrowed down after the insertion of the bristle bunches through frictional heat. To produce the frictional heat, sleeves 166 through which the bristle bunches are supplied are rotated quickly and are pressed against the annular elevations 161' which surround the holes 160'. The final state is then similar to that resulting from the method according to FIGS. 20 to 24, namely, the bristle bunches are form-lockingly gripped in the brush member. In the method according to FIGS. 25 to 27, bristle bunches 165 can be used, the connecting ends 165a of which are already so thick that they substantially fill the holes 160'. It is also not necessary that the ends 165a of the bristle bunches be softened. It is possible with both methods to connect bristle bunches to brush members when the materials of the bristles and the materials of the brush members cannot be directly welded together.

FIGS. 28 to 40 illustrate various devices for the manufacture of bristle bunches.

Figure 28:
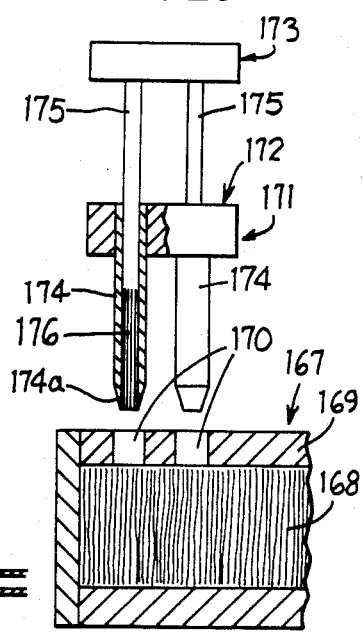
FIG. 28 is a fragmentary sectional side view of a bristle bunch magazine holding bristles cut to size and a mechanism for removing bristles from the magazine.
Figure 29:
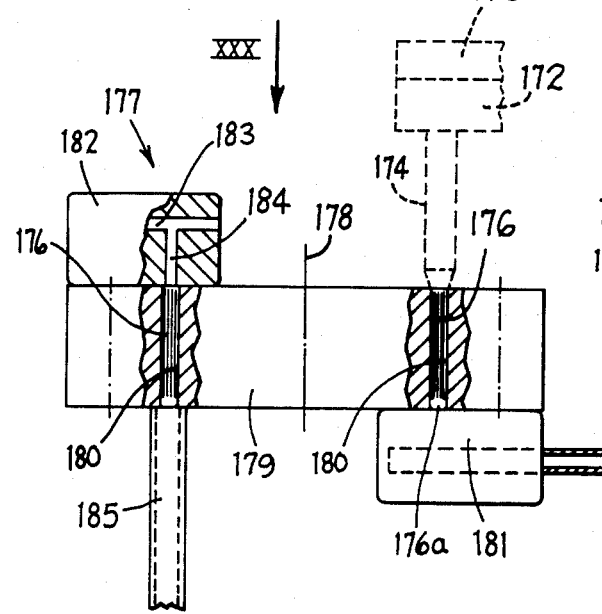
FIG. 29 is a side view, partly in section, of a device for connecting the bristles of a bristle bunch and of a device for transporting finished bristle bunches.
Figure 30:
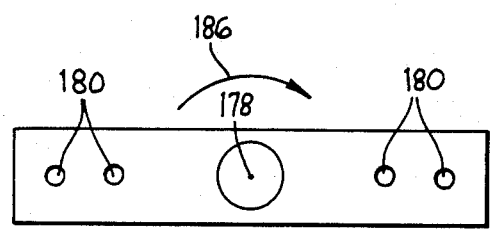
FIG. 30 is a top view of a component of the device according to FIG. 29, taken in the direction of the arrow XXX in FIG. 29.

The arrangement according to FIGS. 28 to 30 includes a magazine 167 for bristles 168 which have already been cut to length. Several holes 170 are provided in a top wall 169 of the magazine 167, of which only two such holes are illustrated in FIG. 28.

A bristle-removing device 171 is associated with the magazine 167. The bristle-removing device 171 has a sleeve holder 172 and a ram holder 173. Plural sleeves 174 are provided on the sleeve holder 172 and are arranged according to the same pattern as the holes 170 in the magazine 167. The sleeves 174 are beveled at their front ends 174a. The ram holder 173 has plural rams 175 which are each slidably supported in a respective sleeve 174. The ram holder 173 is movable vertically relative to the bristle holder 71 so that the rams 175 can be moved within the sleeves 174.

To remove bristle bunches, the sleeve holder is moved downwardly, so that the sleeves 174 move through the bores 170 and into the magazine 167, and thus the openings through the sleeves 174 each become filled with bristles 168. When the sleeves 174 are pulled out of the magazine, the removed bristle bunches 176 remain in the sleeves.

For the further manufacture of the bristle bunches, a device which as a whole is identified with reference numeral 177 is provided (FIGS. 29 and 30). This device has a member 179 which is rotatable about a vertical axis 178 and in which are provided receiving bores 180 for the bristle bunches 176. A heating element 181 is arranged immediately below the member 179.

An air distributor 182 is provided diametrically opposite the heating element, and supplies air from a connecting channel 183 to several channels 184 aligned with respective bores 180. Tubular conduits 185 are arranged below the member 179 and diametrically opposite the heating element 181, which tubular conduits 185 are aligned with respective bores 180.

This brush-manufacturing device operates as follows. After the described removal of the bristle bunches 176 from the magazine 167, the bristle remover 171 is moved to a position above the member 179 in which the sleeves 174 are aligned with respective bores 180. The ram holder 143 is then moved toward the sleeve holder 172, so that the rams 175 are moved through the sleeves 174 and the bristle bunches 176 are thereby pushed into the bores 180 and are pressed against the heating element 181. The bristles are fused at their ends engaging the heating element 181, whereby connecting ends 176a are created. The member 171 is subsequently rotated 180° according to arrow 186, so that the bores 180 which are filled with bristle bunches 176 become aligned with the tubular conduits 185. By blowing pressurized air through the channels 183 and 184, the bristle bunches 176 are forced out of the bores 180 and into the conduits 185, and are moved by the pressurized air to a brush-manufacturing machine, as has already been described.

Figure 31:
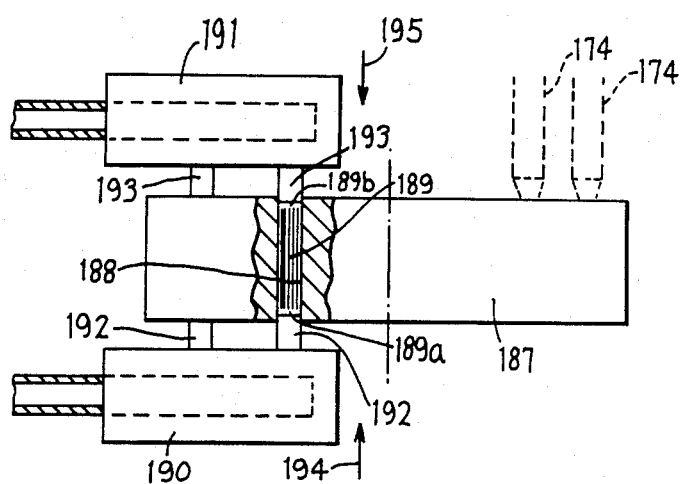
FIG. 31 is a view similar to FIG. 29 showing an alternative embodiment of the machine of FIG. 29 in which bristles are connected with one another at both ends of the bristle bunch.
Figure 32:
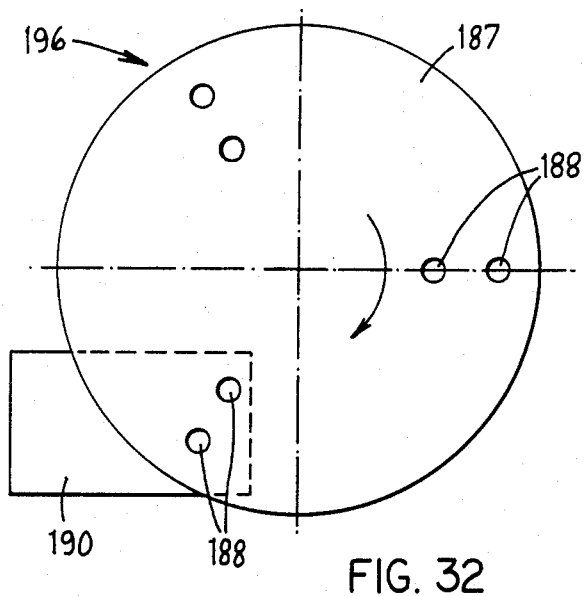
FIG. 32 is a top view of a component of the device according to FIG. 31, taken in the direction of the arrow XXXII in FIG. 31.

Bristle bunches can also be manufactured with the device according to FIGS. 31 and 32, and have bristles which are connected at both ends of the bristle bunch. Such bristle bunches are preferred for the magazine 4' of FIG. 9.

The device according to FIGS. 31 and 32 has a rotatable member 187 in which vertical bores 188 are provided for receiving bristle bunches 189. The loading of the bores 188 with bunches of bristles which are not as yet connected with one another can occur in the same manner as was described in connection with FIGS. 28 and 29. Sleeves which are illustrated in dashes in FIG. 31 are therefore identified with reference numeral 174 in correspondence with FIGS. 28 and 29. The disk-shaped member 187 is rotated with rotary steps of 120°, whereby the bores 188 which are filled with non-connected bristles become aligned with two heating devices 190 and 191. Heating elements 192 and 193 are provided on the heating devices 190 and 191 and can be moved into the bores 188 by moving the heating devices 191 and 192 in the directions of the arrows 194 and 195. The heating elements melt and fuse the ends of the bristles with one another, which causes two connecting ends 189a and 189b to be created on each bristle bunch 189. After the fusing of the bristles with one another, the heating elements are pulled out of the bores 188. During a further rotary step of the disk 187, the bristle bunches move to an ejecting station 196, at which an air distributor similar to that of FIG. 29 can be provided. Such bristle bunches are particularly well suited for being handled loosely, for example in a magazine.

FIGS. 33 to 37 illustrate a device with which bristle bunches are separated from an elongate strand 197 of plural bristles.

The strand 197, from which bristle bunches 198 are manufactured, consists of elongate individual bristles which are pulled off of large storage spools (not illustrated). The device has a transport tongs 199 with legs 199a and 199b which are connected hingedly by a joint bolt 199c. The transport tongs 199 is movable between the positions I (illustrated in solid lines in FIG. 33) and II (illustrated in dashed lines) by a conventional moving mechanism which is not illustrated in the drawings. The tongs legs 199a and 199b can be moved by a device which is also not illustrated between a position (illustrated in FIG. 34), in which the strand 197 is clamped, and a swung apart open position, in which the strand is released.

A clamping mechanism 200, which consists of two parts 201 and 202, also belongs to the device. The parts 201 and 202 can be moved sufficiently far apart with a not illustrated moving mechanism so that the transport tongs 199, when closed, can be moved therebetween. The two parts 201 and 202 form together a clamping mechanism for a cut off bristle bunch, wherein the two parts supplement one another to form a sleeve (see FIG. 37). The clamping mechanism 200 is pivotal about pins 203 and 204. Thus, it can be rotated into a position in which the sleeve is parallel to the strand 197 (illustrated in solid lines in FIG. 33) and also into a position in which the sleeve is perpendicular to the strand 197 (illustrated in dashed lines in FIG. 33).

A knife 205 is also part of the device and can be moved in directions corresponding with the double arrow 206 by a not illustrated moving mechanism.

A further part of the bristle bunches manufacturing device is a mold 207 (FIG. 6) which consists of two parts 207a and 207b and can be heated by an electric heating element 208. The mold 207 contains a mold cavity 209, which is the negative or complement of the desired shape of a connecting end of the bristle bunch 198.

The device operates as follows. When the clamping mechanism 200 is open, the transport tongs 199 moves from the position I to the position II while the tongs legs 199a and 199b are closed and the strand 197 is clamped. In this manner, the strand 197 is pulled one step to the left in FIG. 33. The parts 201 and 202 of the clamping mechanism 200 are subsequently moved together and now hold the strand. The legs 199a and 199b are now opened sufficiently far so that the tongs 199 can move back into the position I without colliding with the clamping mechanism 200. The tongs 199 is then closed again and the knife 205 is moved through the strand so as to separate from same a bristle bunch 198.

The clamping mechanism 200 is then pivoted into the position which is illustrated in dashes in FIG. 33, in which position the bristle bunch 198 points downwardly. This position is also illustrated in FIG. 35, in which the viewing direction is parallel to the strand 197. In this position of the clamping mechanism 200, the mold 207 which consists of the two parts 207a and 207b closes around the lower end of the bristle bunch 198. The mold is heated, whereby the bristles are melted and fill out the mold cavity 209. After a sufficient hardening of the bristle ends by cooling the mold 207, the mold parts 207a and 207b are moved apart. A mushroom-shaped connecting end 198a is now provided on the bristle bunch 198. The clamping mechanism 200 is then moved to a position between a nozzle 211 and a conduit 210, and the finished bristle bunch 198 is moved into the tubular conduit 210 by means of an air stream supplied by the nozzle 211. The conduit 210 is a conduit of a brush-manufacturing machine similar to those described above. After the bristle bunch 198 is removed from the clamping mechanism 200, the clamping mechanism is again pivoted into its horizontal position and is opened, so that it again assumes the position according to FIG. 34. The described operation is then repeated.

The operation was described in connection with the manufacture of a single bristle bunch. In practice, however, one will arrange several of these devices parallel to one another, so that many bristle bunches can be manufactured simultaneously.

Figure 40:
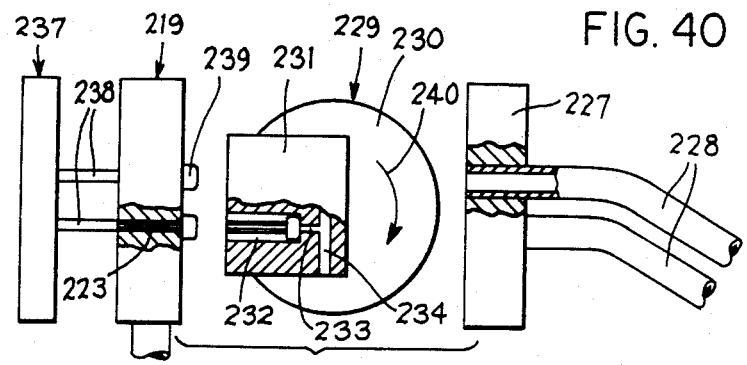
FIG. 40 is a side view, partly in section, of the bristle bunch holder of FIG. 40, of a device for ejecting finished bristle bunches, and of a device for transporting bristle bunches.
Figure 39:
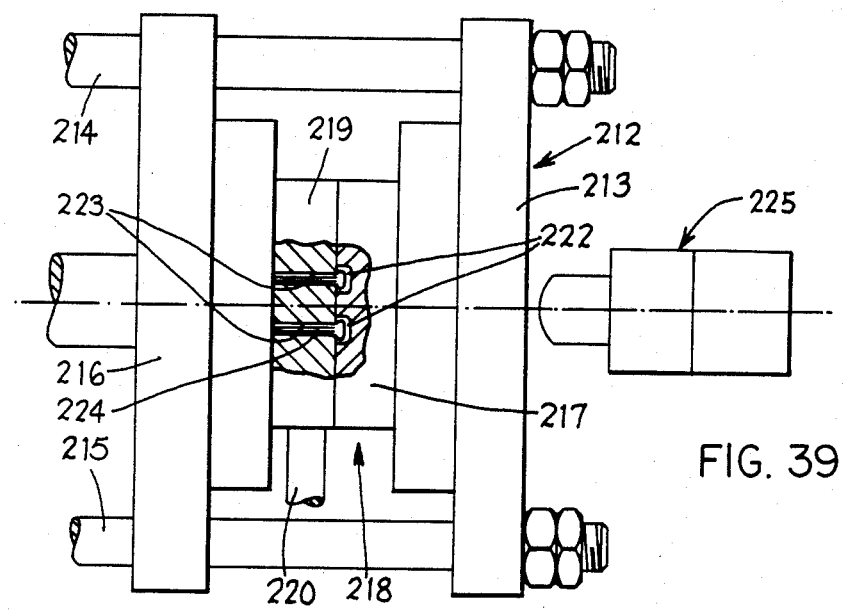
FIG. 39 is a side view, partly in section, of a die-casting machine which includes the bristle bunch holder of FIG. 38 and in which a thermoplastic material is injection-molded around the ends of the bristle bunches.
Figure 38:
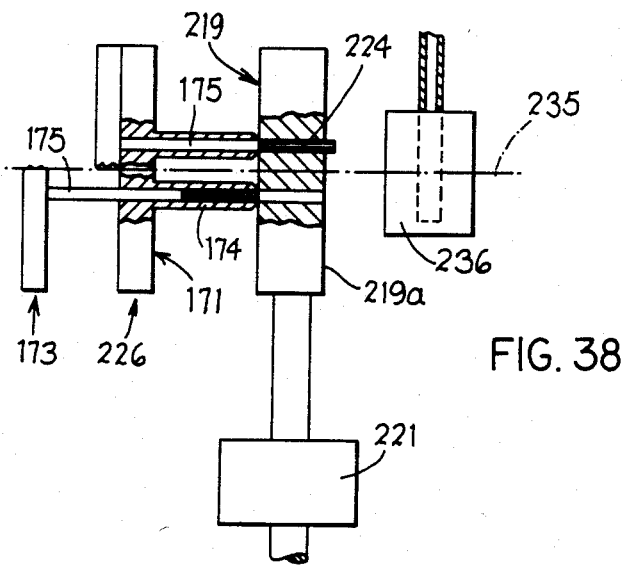
FIG. 38 is a side view, partly in section, of a bristle bunch holder and a device for heating the ends of bristle bunches.

FIGS. 38 to 40 illustrate a device for the manufacture of bristle bunches by injection-molding fastening ends onto the bristle bunches with a thermoplastic material.

The device has an injection-molding machine which is identified as a whole with reference numeral 212 and has a fixed support 213 and a support 216 which can be moved relative to the support 213 along guide rods 214. A first mold part 217 of a die mold, which as a whole is identified with reference numeral 218, is secured on the fixed support 213. The second mold part 219 can be moved laterally out of the die-casting machine. It is for this purpose secured on a rod 220 which is part of a moving mechanism 221, for example a hydraulic cylinder.

Many small recesses 222 are provided in the first mold part 219. Many bores 223 for receivng the bristle bunches 224 are provided in the second mold part. The positioning of the bores 223 corresponds with the arrangement of the recesses 222.

Part of the die-casting machine is also an injection unit 225, with which a melted thermoplastic material can be injected into the closed mold 218.

A filling device 226 for filling the second mold part 219 is also part of the device. Said filling device can be constructed like the device which is illustrated in FIG. 28, for which reason the same reference numerals have been used in FIGS. 28 and 38 for corresponding parts.

To move out the finished bristle bunches, the device which is illustrated in FIG. 40 is provided. Many tubular conduits 228 are connected to a block 227. The pattern of the tubular conduits corresponds to the arrangement of the bores 223 in the second mold part 219.

A transfer device 229 has a rotatable member 230, on which is provided an air distributor 231. The air distributor contains many bores 232 for receiving the finished bristle bunches. Plural air-supply bores 233 each extend from a common connecting channel 234 to a respective bore 232.

The machine according to FIGS. 38 to 40 operates as follows.

When the mold 218 is open, wherein the movable support 216 is further left than is illustrated in FIG. 39, the second mold part 219 is moved out of the die-casting machine to a position (FIG. 38) aligned with the filling device 226. Then, by means of the ram 175, bristle bunches 224 are moved into the second mold part 219, after which the rams 175 temporarily remain in their holding position (illustrated above the dash-dotted line 235 in FIG. 38). The bristle bunches project slightly beyond the surface 219a. A heating element 236 is now moved toward the surface 219a, whereby the bristle bunches 224 are heated at their projecting ends. The rams 175 and heating element 236 are then retracted and the mold part 219 is moved back into the die-casting machine, wherein the ends of the bristle bunches which project from the mold part 219 become aligned with the recesses 222. After closing the mold, the ends of the bristle bunches 224 extend into the cavities 222. The injection unit 225 is now attached to the die mold and the cavities 222 are injected with a thermoplastic material. After a sufficient hardening of the plastic by cooling, the mold is opened and the mold part 219 is moved to a position (FIG. 40) aligned with the transfer device 229.

An ejector 237 with rams 238 is provided in the transfer device, the rams 238 being arranged in a pattern corresponding to the arrangement of the bores 223 in the mold part 219. The finished bristle bunches, on which molded-on heads 239 are now provided, are then moved into the bores 232 of the air distributor 231 by movement of the rams 238. The rotatable member 230 is thereafter rotated 180° according to the arrow 240 so that the bores 232 become aligned with the conduits 228 in the block 227. By introducing pressurized air through the connecting bore 234, all bristle bunches 224 are ejected simultaneously from the air distributor 231 and are moved into conduits 228 which are parts of a brush-manufacturing machine of a type described earlier.

The device according to FIGS. 38 to 40 can make bristle bunches from bristles which cannot be welded directly together. Such bristle bunches are also advantageous when the bristles consist of a material, for example polyamide, which cannot be welded directly to the material of the brush member, for example polypropylene. In this case, the molded-on heads can consist of the material of the brush member, for example polypropylene, so that welding to the brush member is possible.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method of manufacturing a brush, comprising the steps of: manufacturing a plurality of bristle bunches which each include a plurality of bristles, said manufacturing step including the step of connecting the bristles of each said bristle bunch together at one end thereof; thereafter transporting each of said bristle bunches through a respective elongate conduit from a first end to a second end thereof, each said conduit having a length substantially longer than the length of the associated bristle bunches; supporting the bristle bunches transported to said second ends of said conduits in a predetermined orientation relative to each other which is the same relative orientation the bristle bunches are to have in the completed brush; and thereafter simultaneously securing a fastening end of each said bristle bunch to a single brush member.

2. The method according to claim 1, wherein all of said bristle bunches have substantially the same predetermined length; and including after said manufacturing step and prior to said transporting step the steps of: storing in a magazine each of said bristle bunches produced during said manufacturing step, and then introducing into said first end of each said conduit a respective said bristle bunch from said magazine.

3. The method according to claim 1, wherein said one end of each said bristle bunch is said fastening end thereof, and wherein each said bristle bunch is oriented in the associated conduit during said transporting step so that said fastening end thereof is the leading end of said bristle bunch.

4. The method according to claim 1, wherein said manufacturing step includes the step of connecting said bristles of each said bristle bunch together at both ends of the bristle bunch, and including after said transporting step the step of cutting off an end of each said bristle bunch which is remote from said brush member.

5. The method according to claim 1, wherein said bristles are made of a thermoplastic material and said step of connecting the bristles of each said bristle bunch at said one end thereof is carried out by fusing the bristles together using heat.

6. The method according to claim 1, wherein said securing step includes the steps of injection molding a thermoplastic material on said fastening ends of said bristle bunches and then permitting said thermoplastic material to cure, said cured thermoplastic material being said brush member.

7. The method according to claim 1, wherein said transporting step is carried out by introducing pressurized air into said first ends of said conduits to effect movement of said bristle bunches therethrough.

8. The method according to claim 1, wherein said transporting step is carried out by inserting an elongate member into each said conduit from said first end thereof, said members pushing said bristle bunches through said conduits.

9. The method according to claim 1, including prior to said manufacturing step the step of making said brush member from a thermoplastic material, including prior to said securing step the steps of softening regions of said brush member to which bristle bunches are to be secured during said securing step and softening said fastening end of each of said bristle bunches, and wherein said securing step includes the step of pressing said fastening end of each said bristle bunch against a respective one of said softened regions on said brush member.

10. The method according to claim 9, wherein said pressing step causes said softened fastening ends of said bristle bunches to be compressed.

11. The method according to claim 10, wherein said pressing step is carried out by moving said bristle bunches toward said brush member at a high speed so that they are stopped by impacting said brush member.

12. The method according to claim 9, wherein said pressing step is carried out by means for mechanically pressing said bristle bunches against said brush member.

13. The method according to claim 1, wherein said supporting step includes the step of positioning said bristle bunches in bores which open into a mold cavity in a mold in a manner so that their fastening ends are disposed in said mold cavity, and wherein said securing step includes the step of molding said brush member in said mold cavity, said brush member enveloping said fastening ends of said bristle bunches.

14. The method according to claim 13, wherein said step of molding said brush member is carried out by injecting a thermoplastic material into said mold cavity and then permitting said thermoplastic material to cure, said cured thermoplastic material being said brush member.

15. The method according to claim 13, wherein said step of molding said brush member is carried out by introducing a foaming plastic material into said mold cavity and then permitting said plastic material to cure, said cured plastic material being said brush member.

16. The method according to claim 13, wherein said step of molding said brush member is carried out by introducing into said mold cavity a cast resin which hardens through a chemical reaction and then permitting said resin to harden, said hardened resin being said brush member.

17. The method according to claim 13, wherein said molding step is carried out so that said brush member formed in said mold cavity is hollow.

18. The method according to claim 17, wherein said molding step utilizes a blow-molding step to produce the hollow interior of said brush member.

19. The method according to claim 17, wherein said molding step includes the step of swaging a plastic foil to produce said hollow brush member.

20. The method according to claim 13, including after said transporting step and prior to said securing step the step of sealing off said bores with respect to said mold cavity by exerting axial pressure on said fastening ends of said bristle bunches which effects a deformation of said fastening ends in a manner sealing said bores.

21. The method according to claim 20, including prior to said sealing step the step of releasably fixing said bristle bunches against movement within said bores.

22. The method according to claim 20, wherein the fastening ends of the bristle bunches are pressed into enlargements provided at the ends of said bores in said mold.

23. The method according to claim 1, wherein said securing step includes the steps of introducing said fastening ends of said bristle bunches into holes provided in a premanufactured brush member and then creating a form locking grip which prevents said bristle bunches from being pulled out of said holes in said brush member.

24. The method according to claim 23, wherein said step of creating a form locking grip includes the step of reducing the size of a portion of each said hole in said brush member at the outer end thereof by the steps of softening and then deforming the material of said brush member in the region around the outer end of each said hole therein.

25. The method according to claim 23, wherein said holes in said brush member are undercut holes, and wherein said step of creating a form locking grip includes the step of introducing said fastening ends of said bristle bunches into said undercut holes in a softened state so that said fastening ends are each compressed axially and expand radially to a diameter greater than the diameter of the outer end of the associated hole.

26. A machine for manufacturing a brush which includes a brush member and a plurality of bristle bunches secured to and projecting outwardly from the brush member at spaced fastening locations thereon, comprising: a plurality of elongate conduits which each have a first end and a second end and which each have a length substantially longer than the length of each of the bristle bunches; distributor means for introducing into said first end of each said conduit a respective one of the bristle bunches and for causing each such bristle bunch to be transported through the associated conduit from said first end to said second end thereof; bristle bunch holder means for receiving from said second end of each said conduit the bristle bunches transported therethrough; brush member support means for supporting a brush member adjacent said bristle bunch holder means, said bristle bunch holder means including bristle bunch support means for holding the bristle bunches in positions in which, when a brush member is supported in said brush member support means, a fastening end of each bristle bunch is adjacent a respective one of said fastening locations on the brush member and in which the bristle bunches have the same orientations relative to each other that they are to have when secured on the brush member; and means for simultaneously securing the fastening end of each of the bristle bunches to the brush member.

27. The machine according to claim 26, wherein said bristle bunch holder means includes a stationary member, and wherein said bristle bunch support means includes a plurality of nozzles which are each supported on said stationary member for movement toward and away from a brush member supported by said brush member support means and which each hold a respective one of the bristle bunches during connection of the bristle bunches to the brush member.

28. The machine according to claim 27, wherein each movable nozzle is operatively coupled to and moved by a piston which is movable in a fluid actuated cylinder.

29. The machine according to claim 27, wherein each said nozzle includes a collet which can releasably clamp a bristle bunch supported by the nozzle and which is actuated and deactuated by movement of the nozzle relative to a stationary pressure surface.

30. The machine according to claim 26, wherein said bristle bunch holder means has first and second main parts which each have a plurality of bores therein and are movable relative to one another between two positions in which said first and second main parts are respectively spaced from each other and adjacent each other, each said bore in said first main part communicating with a respective said conduit, and each said bore in said second main part being aligned with a respective said bore in said first main part when said first main part and said second main part are in said position adjacent each other, said second main part being a part of said bristle bunch support means.

31. The machine according to claim 30, wherein said bristle bunch holder means includes fluid actuated cylinder means for effecting lengthwise movement of the bristle bunches within said bores in said second main part.

32. The machine according to claim 26, wherein said means for securing the bristle bunches to the brush member includes heating element means which can be moved to a position adjacent said bristle-bunch holder means for thermally softening the fastening ends of the bristle bunches held in said bristle bunch support means.

33. The machine according to claim 26, wherein said distributor means includes a distributor block having a plurality of ejection cavities which each periodically receive a bristle bunch from a respective one of a plurality of storage chambers provided in said distributor block, and wherein said first end of each said conduit is dligned with and can receive a bristle bunch from a respective one of said ejection cavities.

34. The machine according to claim 33, wherein said distributor means includes a plurality of ejecting rams which can each be moved into a respective said ejection cavity so as to move a bristle bunch from each said ejection cavity into said first end of a respective one of said conduits, each said ram having therethrough an air channel through which compressed air can be supplied to the associated conduit to effect the transfer of a bristle bunch in the conduit from the first end to the second end of the conduit.

35. The machine according to claim 34, wherein said means for securing said bristle bunches to said brush member includes heating element means for thermally softening the fastening ends of bristle bunches disposed in said ejection cavities of said distributor block.

36. The machine according to claim 34, wherein the bristle bunches in each said storage chamber have their bristles connected together at each end thereof, and including cutting means for cutting off one end of each bristle bunch when it is in one of said ejection cavities in said distributor block.

37. The machine according to claim 33, wherein said distributor means includes a magazine which can hold a plurality of bristle bunches and which is movable along the distributor block through successive positions in which it communicates with and supplies bristle bunches to respective said storage chambers in said distributor block.

38. The machine according to claim 26, wherein said distributor means includes a plurality of elongate slide members which can each be moved in a lengthwise direction into the first end of a respective said conduit for effecting movement of a bristle bunch through such conduit.

39. The machine according to claim 38, wherein each said slide member is introduced into the associated conduit through a Y-shaped connecting piece which has a stem portion and two branch portions, said stem portion being aligned with the first end of the associated conduit and said slide member, in a retracted position, being disposed within one of said branch portions of said connecting piece.

40. The machine according to claim 38, wherein each said conduit is substantially straight, and wherein each said slide member is a rigid, straight pin.

41. The machine according to claim 38, wherein each said slide member is flexible.

42. The machine according to claim 26, including means for manufacturing bristle bunches and for supplying the bristle bunches to said distributor means.

43. The machine according to claim 42, wherein said means for manufacturing bristle bunches includes a bristle magazine containing bristles which are cut to length, a sleeve and means for introducing said sleeve into and retracting it from said magazine through holes provided in a wall of said magazine, said sleeve having a plurality of bristles therein upon retraction, and heating element means for thermally fusing said plurality of bristles to each other at one end thereof.

44. The machine according to claim 43, wherein said means for manufacturing bristle bunches includes a movable holding member having a bore therein and means for transferring bristles from said sleeve to said bore in said holding member, said heating element means carrying out said fusing of the ends of the bristles while they are in said bore of said holding member, said holding member being movable from a fusing position in which said bore therein is in the region of said heating element means to a discharge station at which said bore in said holding member is aligned with a respective one of said conduits, and conveying means in the region of said discharge station for moving the bristle bunch from the bore in said holding member into the associated conduit by directing pressurized air against an end of the bristle bunch remote from the conduit.

45. The machine according to claim 42, wherein said means for manufacturing bristle bunches includes removing means for removing a strand of bristles from at least one storage spool, cutting means for cutting a bristle bunch from an end of said strand, and heating means for fusing the bristles of the bristle bunch together at one end thereof.

46. The machine according to claim 45, wherein said removing means includes a pivotally supported clamping means for holding the bristle bunch while it is cut from said strand and has said one end fused, and for thereafter moving the bristle bunch to a position in which it is aligned with said first end of a respective one of said conduits.

47. The machine according to claim 42, wherein said means for manufacturing bristle bunches includes a die mold having several small cavities which can each receive the end of a respective bristle bunch, and including slide member means for supporting a plurality of bristle bunches and for moving an end of each bristle bunch into a respective one of said cavities in said die mold.

48. The machine according to claim 47, wherein said means for manufacturing bristle bunches includes heating means for heating the ends of the bristle bunches just before they are introduced into said cavities in said die mold.

49. The machine for manufacturing a brush which includes a brush member and a plurality of bristle bunches secured to and projecting outwardly from the brush member at spaced locations thereon, comprising: a plurality of conduits which each have a first end and a second end and which each have a length substantially longer than the length of each of the bristle bunches; distributor means for introducing into said first end of each said conduit a respective one of the bristle bunches and for causing each such bristle bunch to be transported through the associated conduit from said first end to said second end thereof; mold means having therein a mold cavity in the shape of the brush member, said mold means including bristle bunch holding means for receiving from said second end of each said conduit the bristle bunches transported therethrough and for supporting each such bristle bunch in a respective receiving opening which communicates with said mold cavity in a manner so that a fastening end of each bristle bunch is in the region of said mold cavity and so that the bristle bunches have the same orientation relative to each other that they are to have in the completed brush; and means for introducing a plastic material into the mold cavity in a manner so that the fastening ends of the bristle bunches become enveloped and for then permitting said plastic material to cure, said cured plastic material being the brush member.

50. The machine according to claim 49, wherein said mold means includes first and second mold parts which can be moved between spaced and adjacent positions and which have thereon respective surface portions which define said mold cavity when said mold parts are adjacent, said second mold part being a part of said bristle bunch holding means and having said receiving bores therein, and wherein said mold means includes a stop member which can be moved to a position between the mold parts when the mold parts are spaced and can engage the fastening ends of the bristle bunches.

51. The machine according to claim 50, wherein said stop member, when positioned between said mold parts, is supported for movement toward said second mold part so as to axially compress the fastening ends of the bristle bunches.

52. The machine according to claim 51, wherein said bristle bunch holding means includes a slide member movably supported on a side of said second mold part remote from said surface portion thereon and having a plurality of bores therein, said slide member being movable between two positions in which each said bore therein is respectively aligned with and offset from a respective one of said receiving openings in said second mold part, wherein when said slide member is in the position in which said bores therein are offset from said receiving openings, said slide member holds the bristle bunches in the receiving openings against movement away from the mold cavity.

53. The machine according to claim 52, wherein said slide member has thereon a stop surface which faces said second mold part and engages ends of the bristle bunches remote from the fastening ends thereof when said slide member is in the position in which said bores therein are offset from said receiving openings in said second mold part.

54. The machine according to claim 52, wherein the bristle bunches in said receiving openings in said second mold part extend into said bores in said slide member; and wherein, when said slide member is in the position in which said bores therein are offset from said receiving openings in said second mold part, said slide member and said second mold part clamp the bristle bunches against lengthwise movement.

55. The machine according to claim 49, wherein said plastic material introduced into said mold cavity is a foaming plastic; wherein said first mold part has a recess therein and said second mold part has a projection thereon which can be slidably received in said recess in said first mold part, said mold cavity being located within said recess and having a size determined by the position of said projection within said recess, and said second mold part having a plurality of sleeves movably supported therein, the interior of each said sleeve being a respective one of said receiving openings for the bristle bunches; and wherein, in an initial position of said projection within said recess during the introduction of said plastic material into said mold cavity, the fastening ends of the bristle bunches are within the projection, said projection thereafter being moved within said recess and relative to said sleeves to a further position in which the fastening ends of the bristle bunches project outwardly beyond said projection and into said mold cavity.

56. The machine according to claim 49, wherein said mold means includes a receiving slide member which has receiving bores therein and which can be moved between a first position in which it is spaced from the first and second mold parts and said receiving bores therein are each aligned with the second end of a respective said conduit and, when said mold parts are in said spaced position, a second position between said mold parts in which said receiving bores are each aligned with a respective one of said receiving openings in said second mold part, said mold means further including means for transferring bristle bunches from the receiving bores in said slide member to said receiving openings in said second mold part.

57. The machine according to claim 56, wherein said mold means includes a plurality of molds which each include one of said first mold parts and one of said second mold parts, said molds being supported on a moving member which successively positions said molds so that said receiving slide member can move relative to each said mold to said second position between the mold parts thereof when the mold parts are spaced.

* * * * *